United States Patent
Chen et al.

(10) Patent No.: US 11,900,577 B2
(45) Date of Patent: Feb. 13, 2024

(54) PROCESSING APPARATUS FOR PERFORMING PROCESSING USING A CONVOLUTIONAL NEURAL NETWORK

(71) Applicant: CANON KABUSHIKI KAISHA, Tokyo (JP)

(72) Inventors: Tsewei Chen, Tokyo (JP); Masami Kato, Kanagawa (JP); Shiori Wakino, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 108 days.

(21) Appl. No.: 17/353,959

(22) Filed: Jun. 22, 2021

(65) Prior Publication Data

US 2022/0012856 A1 Jan. 13, 2022

(30) Foreign Application Priority Data

Jul. 9, 2020 (JP) ................................. 2020-118737

(51) Int. Cl.
*G06T 5/20* (2006.01)
*G06V 30/194* (2022.01)
(Continued)

(52) U.S. Cl.
CPC ................ *G06T 5/20* (2013.01); *G06T 3/606* (2013.01); *G06T 5/009* (2013.01); *G06T 5/10* (2013.01);
(Continued)

(58) Field of Classification Search
CPC ........... G06T 5/20; G06T 3/606; G06T 5/009; G06T 5/10; G06T 2207/20081;
(Continued)

(56) References Cited

U.S. PATENT DOCUMENTS 8,885,930 B2    11/2014    Yamamoto et al.
10,210,419 B2    2/2019    Nomura et al.
(Continued)

FOREIGN PATENT DOCUMENTS

CN    108154228 B    * 12/2017

OTHER PUBLICATIONS

Sun, Wei, et al. "A lightweight neural network combining dilated convolution and depthwise separable convolution." Cloud Computing, Smart Grid and Innovative Frontiers in Telecommunications. Springer, Cham, 2019. 210-220. (Year: 2019).*
(Continued)

*Primary Examiner* — Andrae S Allison
(74) *Attorney, Agent, or Firm* — Carter, DeLuca & Farrell LLP

(57) ABSTRACT

There is provided with a processing apparatus. A data holder holds at least some of data of a plurality of channels in a target layer among a plurality of layers. Each of a plurality of processors performs, in parallel, a product-sum operation using the data of one channel of the target layer and a coefficient corresponding to the target layer. A selector selects whether to perform first processing or second processing on the basis of information specifying processing in the target layer. The first processing includes inputting the data of one channel of the target layer into one of the plurality of processors. The second processing includes inputting the data of one channel of the target layer to the plurality of processors in parallel.

20 Claims, 22 Drawing Sheets

(51) Int. Cl.
*G06T 3/60* (2006.01)
*G06T 5/00* (2006.01)
*G06T 5/10* (2006.01)

(52) U.S. Cl.
CPC .. *G06V 30/194* (2022.01); *G06T 2207/20081* (2013.01); *G06T 2207/20084* (2013.01)

(58) Field of Classification Search
CPC ........ G06T 2207/20084; G06V 30/194; G06N 3/0481; G06N 3/063; G06N 3/0454; G06F 17/153
See application file for complete search history.

(56) References Cited

U.S. PATENT DOCUMENTS

| | | | |
|---|---|---|---|
| 10,268,881 B2 | 4/2019 | Chen | |
| 10,360,470 B2 | 7/2019 | Yang et al. | |
| 2015/0074163 A1* | 3/2015 | Horio | G06F 7/5443 708/607 |
| 2017/0323197 A1 | 11/2017 | Gibson et al. | |
| 2018/0267776 A1* | 9/2018 | Ukai | G06F 7/5443 |
| 2019/0318258 A1* | 10/2019 | Koyama | G06F 30/20 |
| 2020/0065154 A1 | 2/2020 | Huang et al. | |
| 2020/0293885 A1 | 9/2020 | Yoshinaga et al. | |
| 2020/0394516 A1* | 12/2020 | Chen | G06F 18/2413 |
| 2021/0201141 A1* | 7/2021 | Ishibushi | G06N 3/08 |
| 2021/0287070 A1* | 9/2021 | Chen | G06N 3/0454 |
| 2022/0198622 A1* | 6/2022 | Kumar | G06N 3/063 |
| 2022/0207293 A1* | 6/2022 | Yao | G06T 3/4053 |
| 2022/0253506 A1* | 8/2022 | Ahmadi | G06F 9/545 |
| 2022/0300253 A1* | 9/2022 | Nagamatsu | G06F 7/5443 |
| 2022/0335282 A1* | 10/2022 | Park | G06N 3/063 |

OTHER PUBLICATIONS

Chen, Tse-Wei et al. "Hardware Architecture of Embedded Inference Accelerator and Analysis of Algorithms for Depthwise and Large-Kernel Convolutions," Proceedings, Part V, Computer Vision—ECCV 2020 Workshops, Aug. 23-28, 2020, vol. 12539, pp. 3-17, Glasgow, UK, Springer International Publishing, Cham, EX055865039, ISSN: 0302-9743 ISBN: 978-3-030-68238-5, DOI: 10.1007/978-3-030-68238-5_1, Retrieved from the Internet: URL:https://link.springer.com/content/pdf/10.1007/978-3-030-68238-5_1.pdf>.

Extended European Search Report issued by the European Patent Office dated Dec. 22, 2021 in corresponding EP Patent Application No. 21180760.7.

Examination Report issued by the Intellectual Property Office of India dated Mar. 28, 2022 in corresponding IN Patent Application No. 202144029740, with English translation.

Andrew G. Howard, et al., MobileNets: Efficient convolutional neural networks for mobile vision applications CoRR, arXiv: 1704.04861v1 (Apr. 17, 2017), pp. 1-9.

Bing Liu, et al., "An FPGA-Based CNN Accelerator Integrating Depthwise Separable Convolution" Electronics (Mar. 2019) pp. 1-18, vol. 8, No. 281.

Yunxuan Yu, et al., "Light-OPU: An FPGA-based overlay processor for lightweight convolutional neural networks" Proceedings of the 2020 ACM/SIGDA International Symposium on Field-Programmable Gate Arrays (Feb. 2020) pp. 122-132.

* cited by examiner

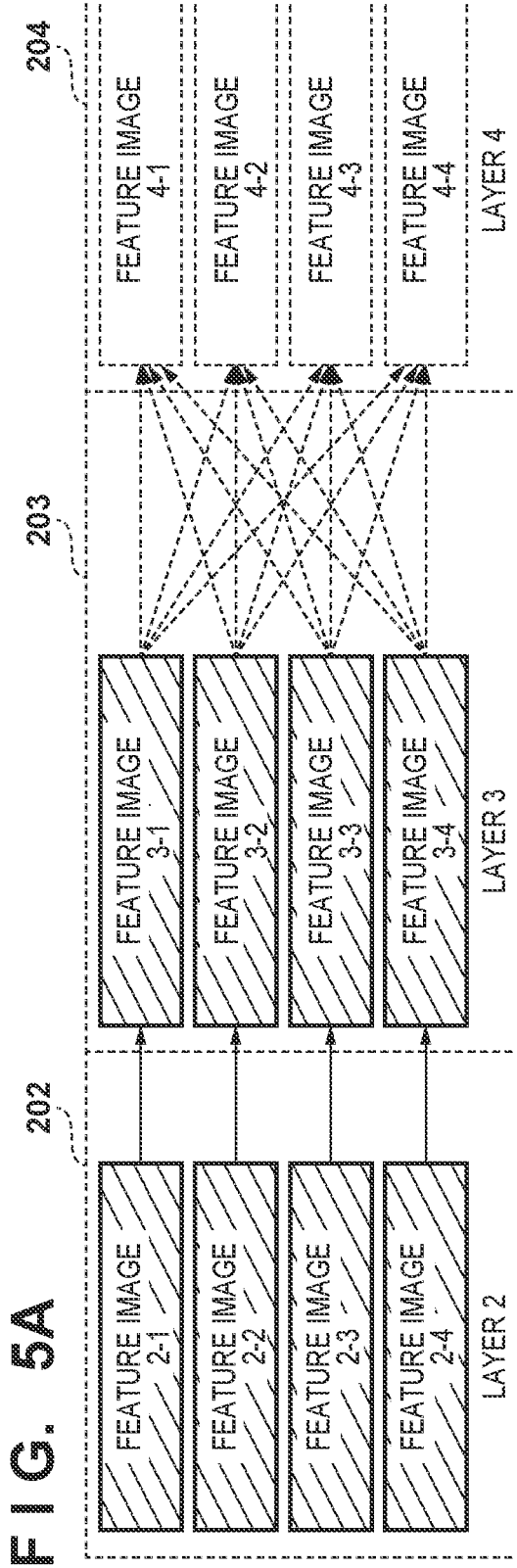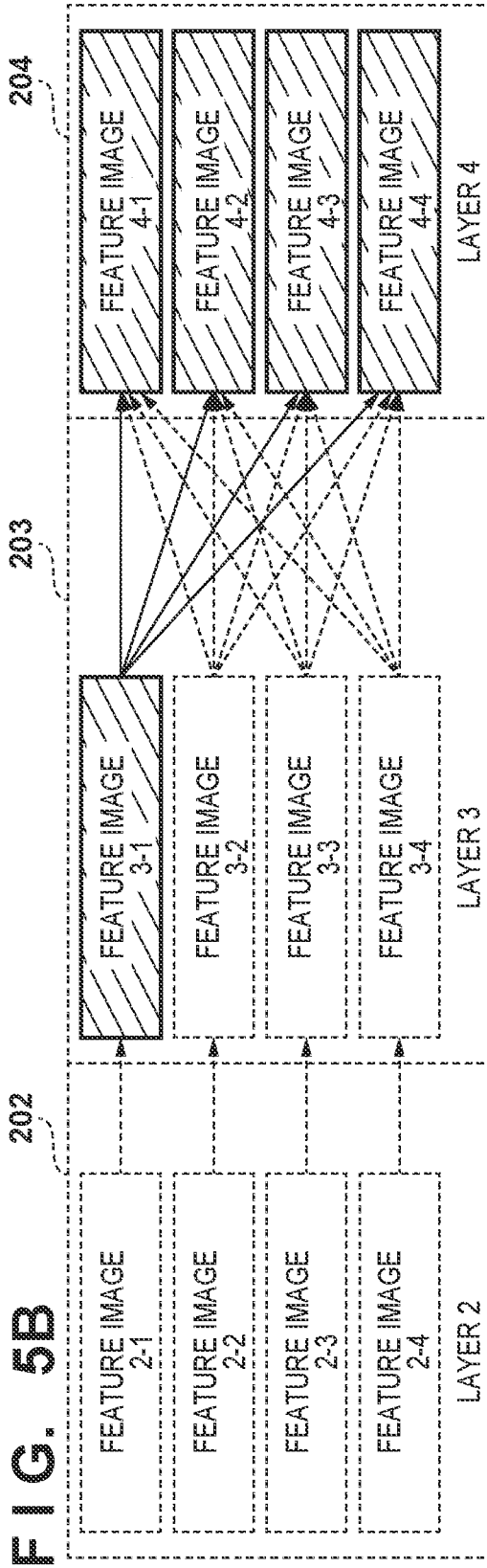

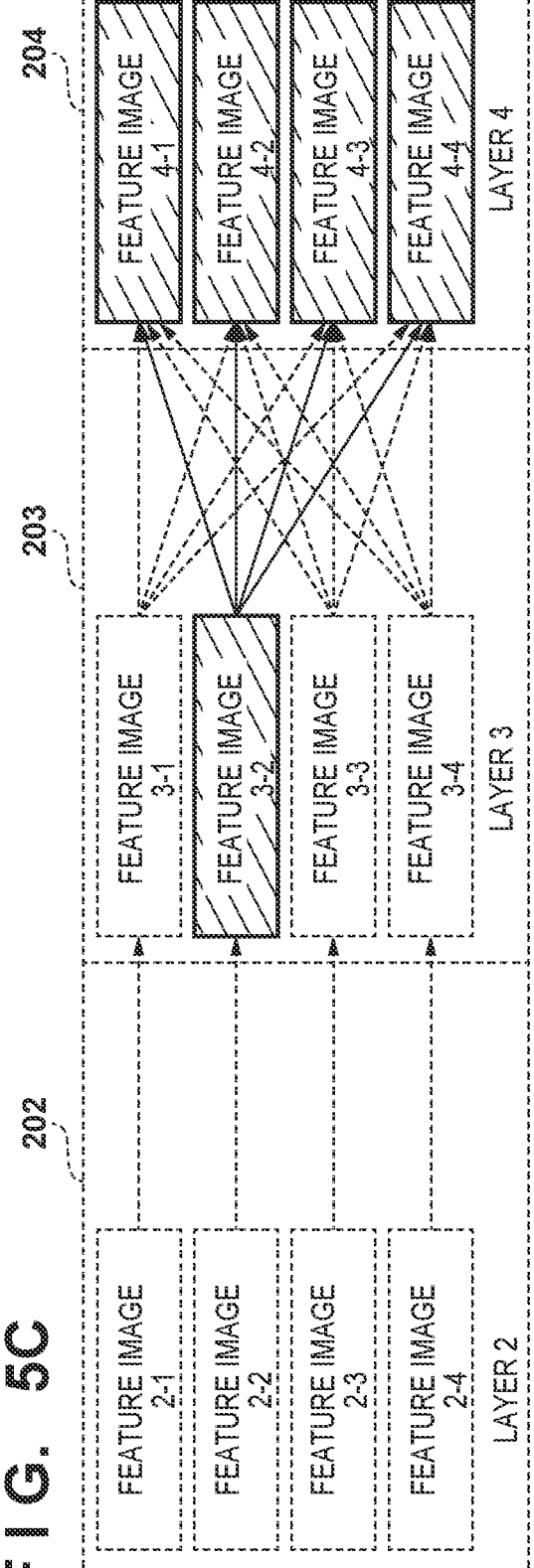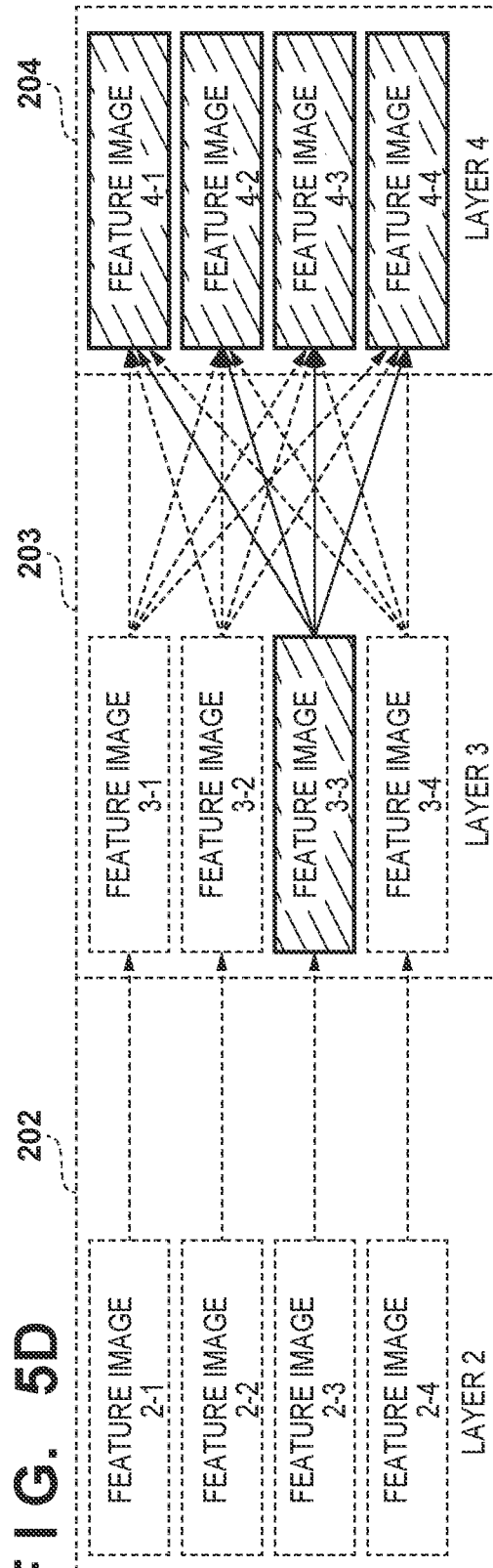

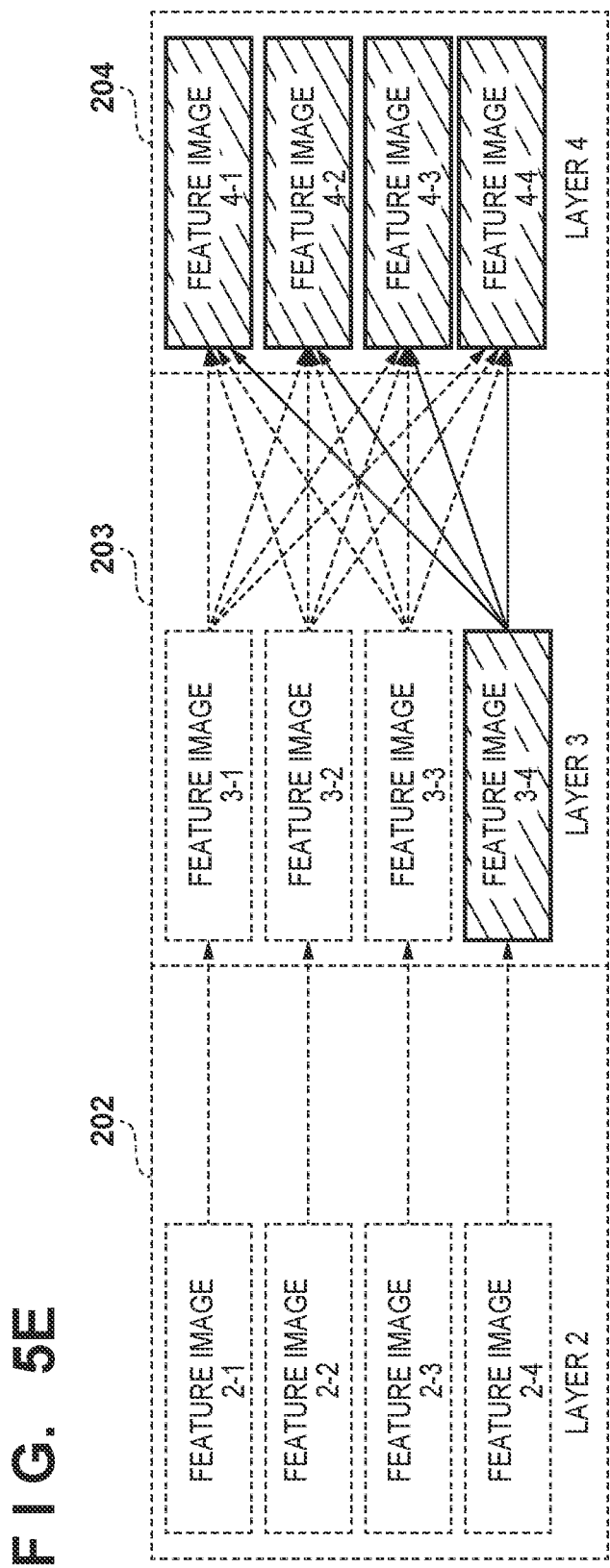

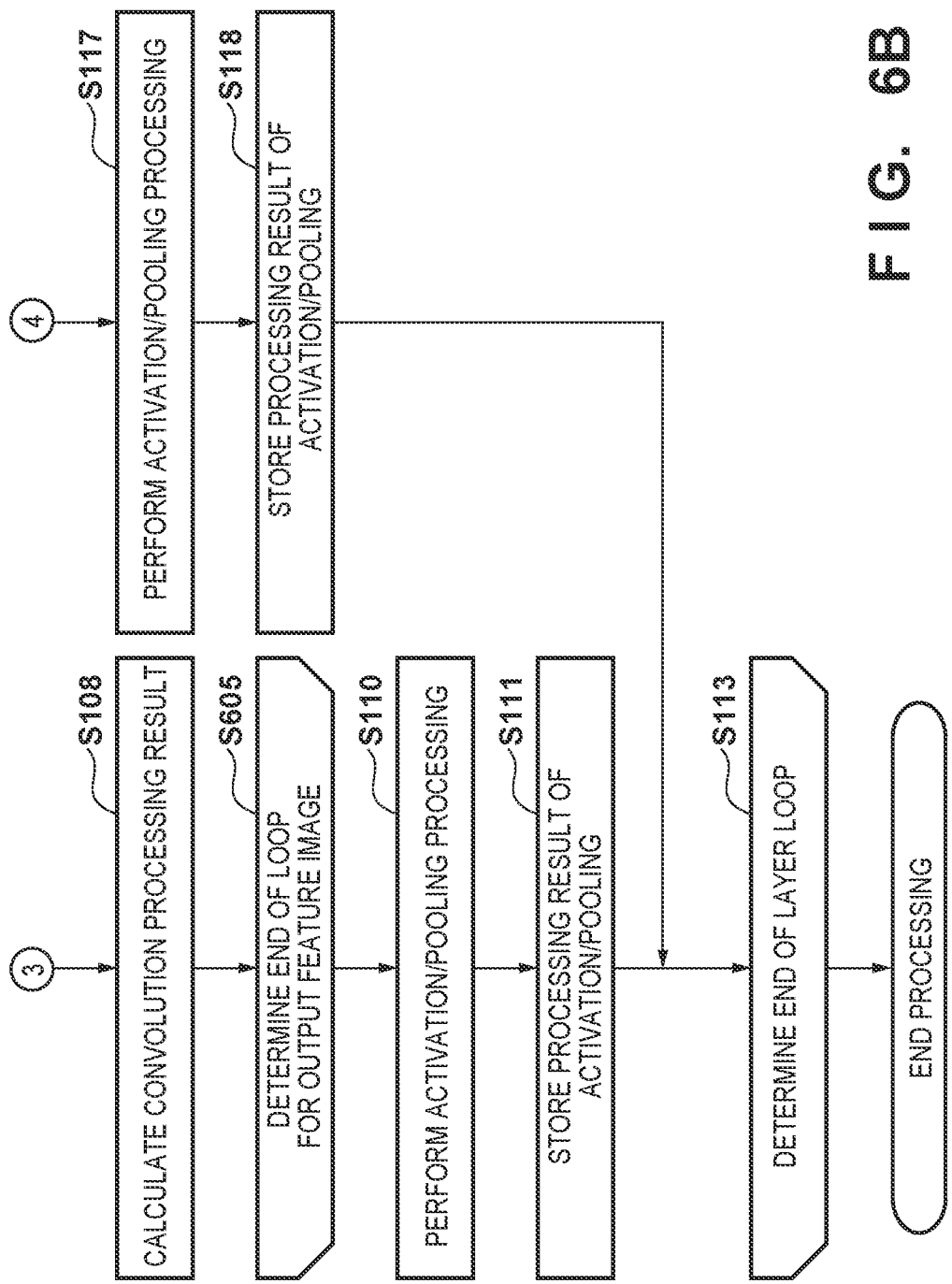

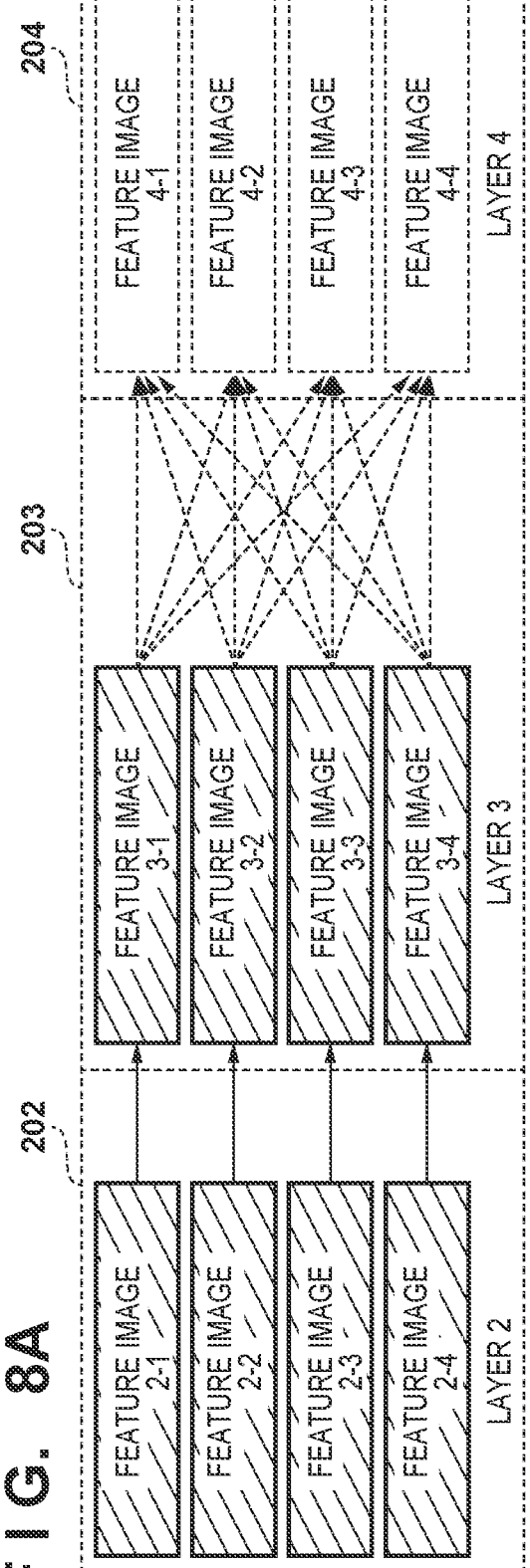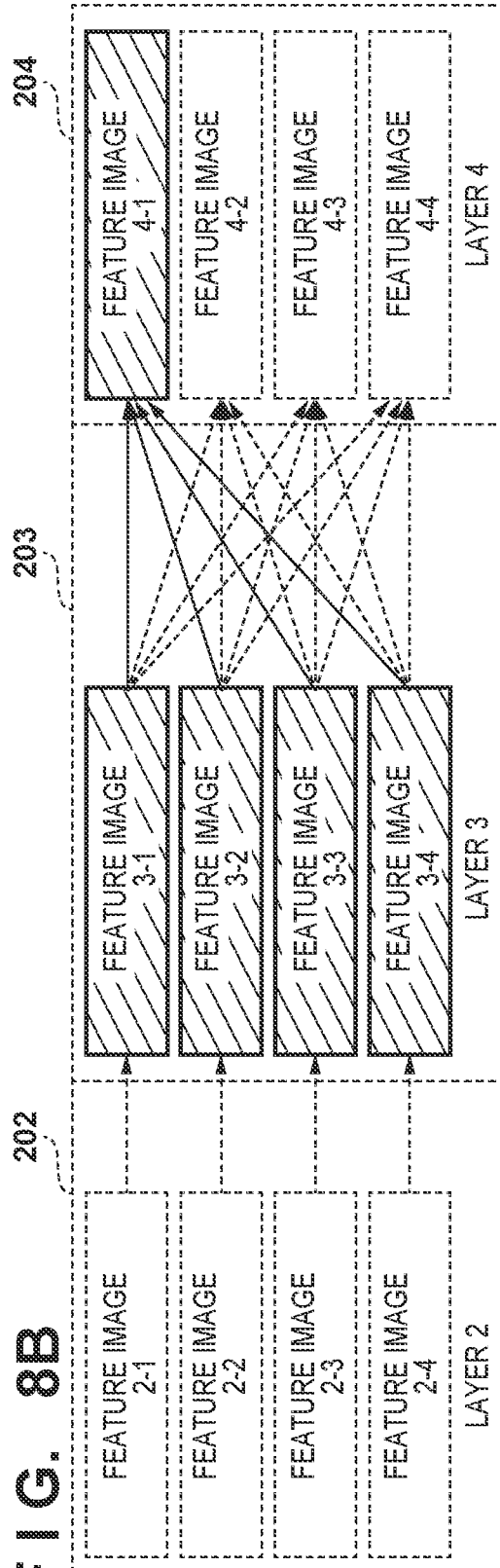

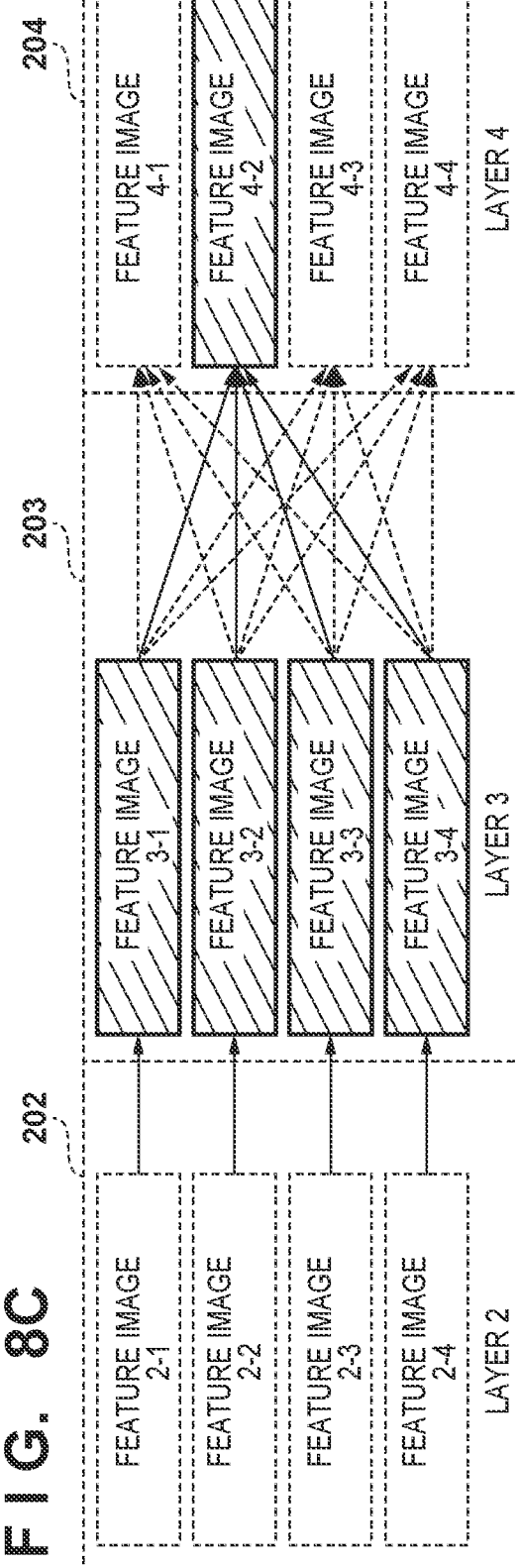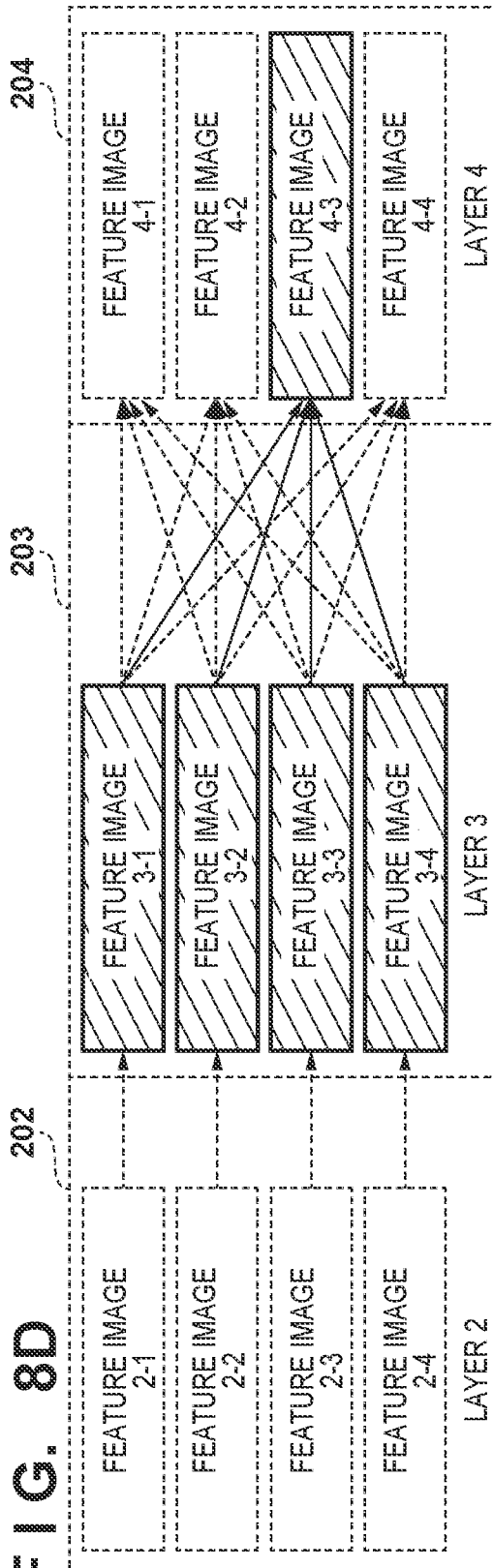

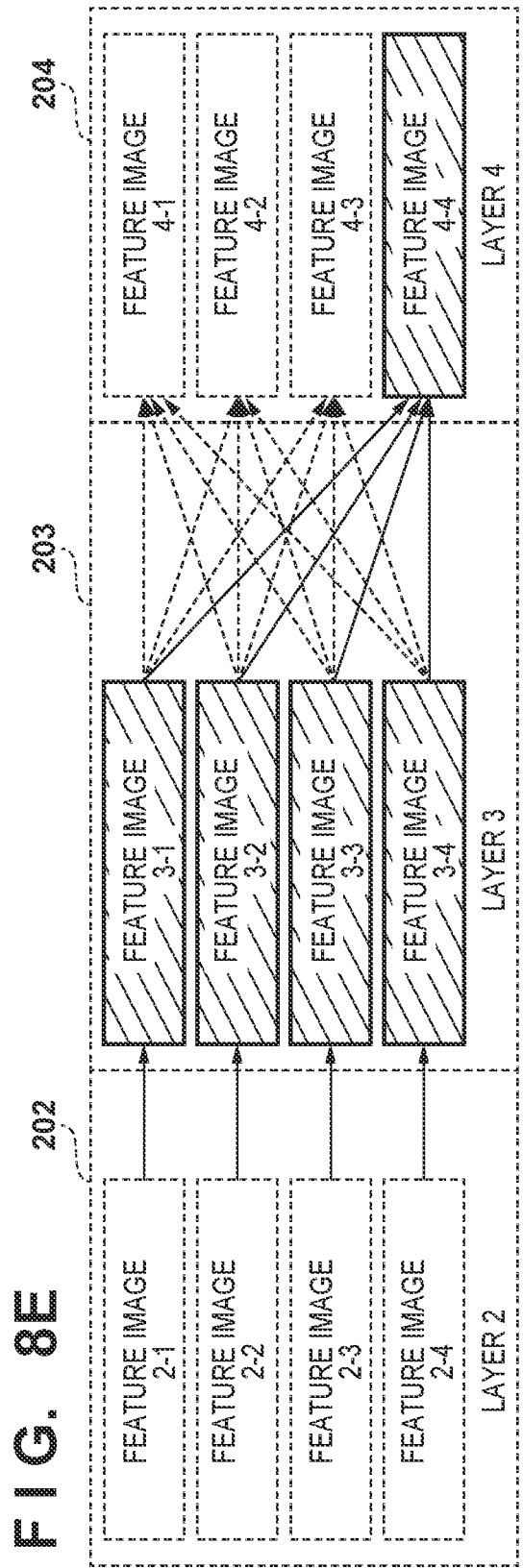

| EXAMPLE OF IC=OC=2PE_num | 0 CYCLE | T CYCLE | 2T CYCLE | 3T CYCLE | 4T CYCLE |
|---|---|---|---|---|---|
| TRANSFER COEFFICIENT AND FEATURE PLANE | I(1)...I(IC/2) | I(IC/2+1)...I(IC) | | | |
| CONVOLUTION PROCESSING (MULTIPLICATION) | | I(1)...I(IC/2) | I(IC/2+1)...I(IC) | | |
| CONVOLUTION PROCESSING (ACCUMULATION) | | | I(1)...I(IC/2) | I(IC/2+1)...I(IC) | |
| ACTIVATION PROCESSING | | | | O(1)...O(IC/2) | O(IC/2+1)...O(IC) |

FIG. 13

```
REPEAT FOR i = 1, 2, ..., (LAYER NUMBER)
  SET PARAMETER OF LAYER
   IN CASE WHERE IT IS DETERMINED THAT
   DEPTHWISE CONVOLUTION PROCESSING IS NOT PERFORMED
    REPEAT FOR j = 1, 2, ..., (BLOCK NUMBER)
      REPEAT FOR m=1, 2, ..., IC
        CALCULATE OUTPUT BLOCK PARTIALLY USING jTH BLOCK OF
        mTH FEATURE IMAGE AND
        FILTER WEIGHTING COEFFICIENT OF (i, m, n) SET
      CALCULATE ACTIVATION PROCESSING RESULT OF OUTPUT BLOCK
   IN CASE WHERE IT IS DETERMINED THAT
   DEPTHWISE CONVOLUTION PROCESSING IS PERFORMED
    REPEAT FOR j = 1, 2, ..., (BLOCK NUMBER)
      CALCULATE OUTPUT BLOCK PARTIALLY USING jTH BLOCK OF
      nTH FEATURE IMAGE AND
      FILTER WEIGHTING COEFFICIENT OF (i, n, n) SET
      CALCULATE ACTIVATION PROCESSING RESULT OF OUTPUT BLOCK
```

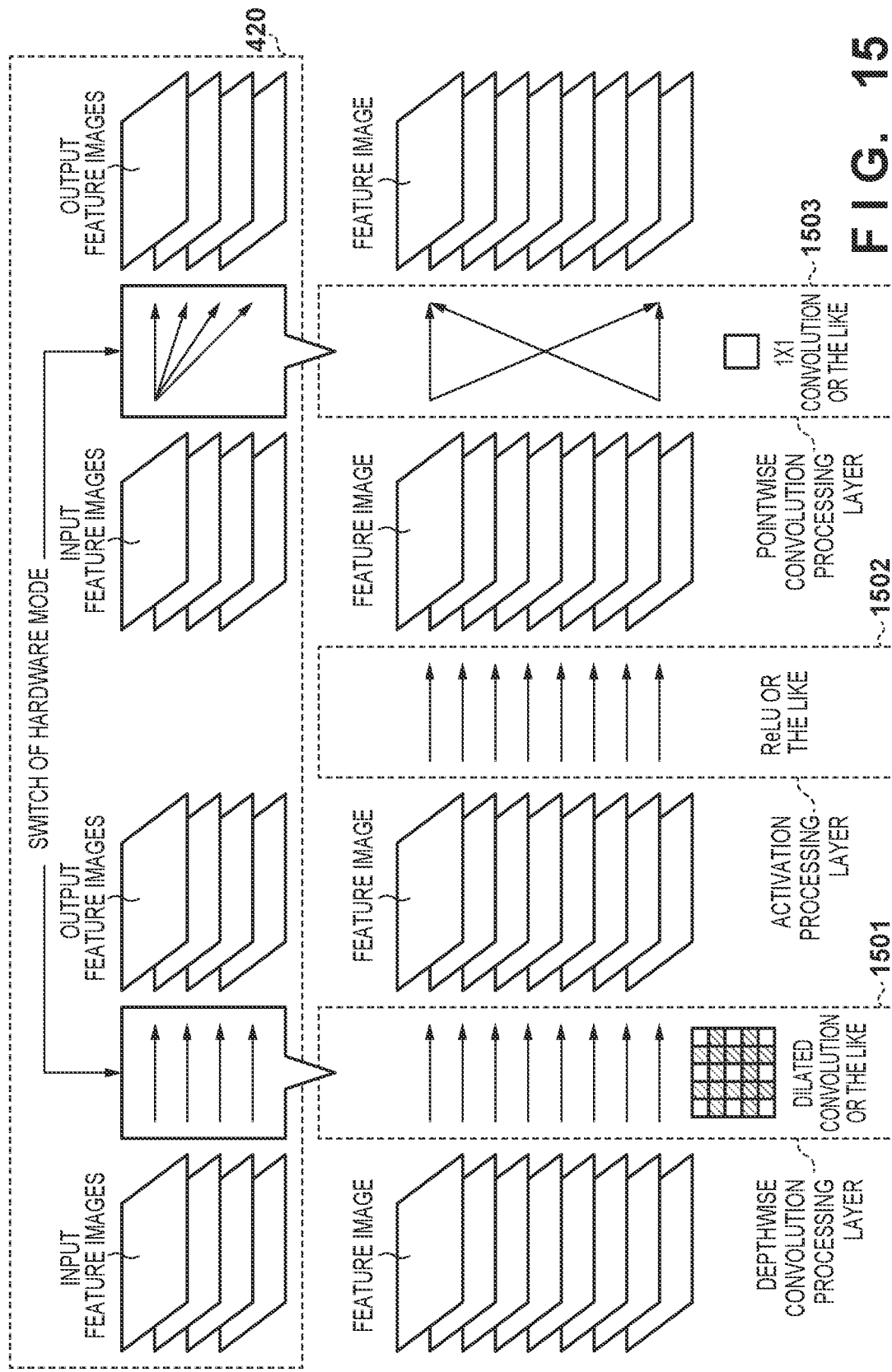
F I G. 15

PROCESSING APPARATUS FOR PERFORMING PROCESSING USING A CONVOLUTIONAL NEURAL NETWORK

BACKGROUND OF THE INVENTION

Field of the Invention

The present invention relates to an processing apparatus, and relates in particular to hardware for performing processing using a convolutional neural network.

Description of the Related Art

Recent advances in deep learning have increased the accuracy of image recognition. A convolutional neural network (CNN) is known as a method used for deep learning. CNNs are being employed in a variety of applications, but processing using a CNN requires performing a large number of product-sum operations. As such, when implementing a CNN in an embedded system such as a mobile terminal or an in-vehicle device, there is a need to reduce processing times by reducing the amount of feature data and filter weighting coefficients which are transferred or by performing the product-sum operations more efficiently.

Howard (Andrew G. Howard, et al., "MobileNets: Efficient convolutional neural networks for mobile vision applications.", CoRR, abs/1704.04861 (2017)) proposes the use of depthwise convolution in combination with pointwise convolution as a technique to reduce computational amounts. Meanwhile, U.S. patent Ser. No. 10/360,470, Liu (Bing Liu, et al., "An FPGA-Based CNN Accelerator Integrating Depthwise Separable Convolution", Electronics, 2019, vol. 8, p. 281), and Yu (Yunxuan Yu, et al., "Light-OPU: An FPGA-based overlay processor for lightweight convolutional neural networks". Proceedings of the 2020 ACM/SIGDA International Symposium on Field-Programmable Gate Arrays, p. 122 (2020)) have proposed methods for implementing depthwise convolution processing using hardware.

SUMMARY OF THE INVENTION

According to an embodiment of the present invention, a processing apparatus for performing operations with a convolutional neural network having a plurality of layers comprises: a data holder configured to hold at least some of data of a plurality of channels in a target layer among the plurality of layers; a plurality of processors, each configured to perform, in parallel, a product-sum operation using the data of one channel of the target layer and a coefficient corresponding to the target layer; and a selector configured to select whether to perform first processing or second processing on the basis of information specifying processing in the target layer, the first processing including inputting the data of one channel of the target layer, held by the data holder, into one of the plurality of processors, and the second processing including inputting the data of one channel of the target layer, held by the data holder, to the plurality of processors in parallel.

According to another embodiment of the present invention, a processing apparatus for performing operations with a convolutional neural network having a plurality of layers comprises: a data holder configured to hold at least some of data of a plurality of channels in a target layer among the plurality of layers; a plurality of processors, each configured to perform, in parallel, a product-sum operation using the data of one channel of the target layer and a coefficient corresponding to the target layer; an accumulator configured to accumulate processing results of each of the plurality of processors; and a selector configured to select whether to perform first processing or second processing on the basis of information specifying processing in the target layer, the first processing including outputting processing results of respective processors of the plurality of processors as respective processing results corresponding to respective channels in the next layer after the target layer, and the second processing including outputting a processing result obtained by the accumulator as a processing result corresponding to a single channel in the next layer.

Further features of the present invention will become apparent from the following description of exemplary embodiments (with reference to the attached drawings).

BRIEF DESCRIPTION OF THE DRAWINGS

FIGS. 5A to 5E are diagrams illustrating a sequence of convolution processing according to one embodiment.

FIGS. 6A to 6B illustrate a flowchart of convolution processing according to one embodiment.

FIGS. 8A to 8E are diagrams illustrating a sequence of convolution processing according to one embodiment.

FIG. 13 is a diagram illustrating an example of pseudocode for block-based convolution processing.

FIG. 15 is a diagram illustrating convolution processing performed in one embodiment.

DESCRIPTION OF THE EMBODIMENTS

Figure 1A:
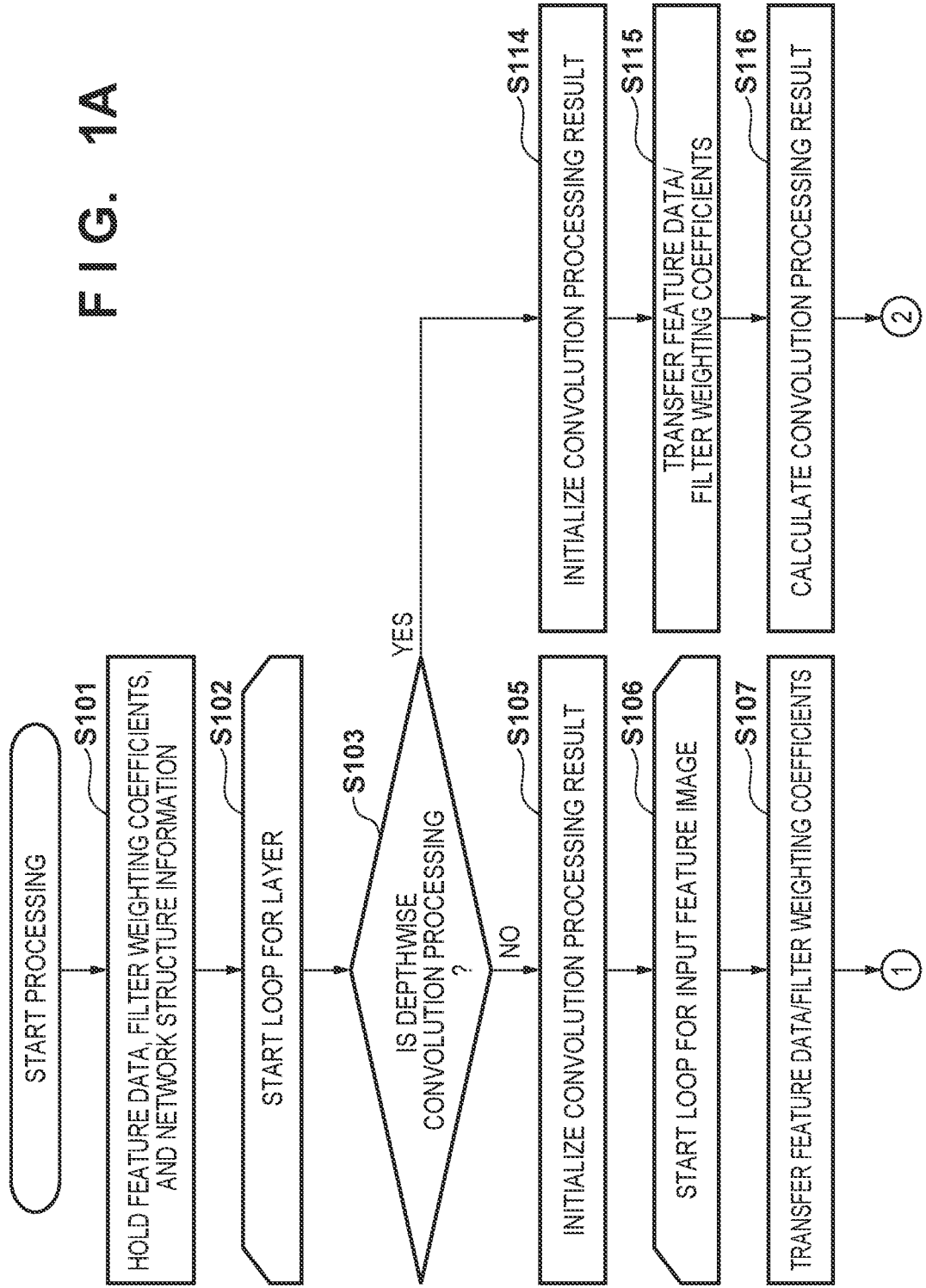
FIGS. 1A to 1B illustrate a flowchart of convolution processing according to one embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

There is still a need for hardware that can perform both conventional convolution processing and depthwise convolution processing in a short amount of time. For example, with the methods described in U.S. patent Ser. No. 10/360,470 and Liu, depthwise convolution processing is achieved by setting some of the filter weighting coefficients to zero and performing conventional convolution processing, and thus the merits of reducing the computational amount in the depthwise convolution processing are not fully utilized.

One embodiment of the present invention can improve the processing efficiency of hardware that performs both conventional convolution processing or pointwise convolution processing and depthwise convolution processing.

First Embodiment

Figure 3:
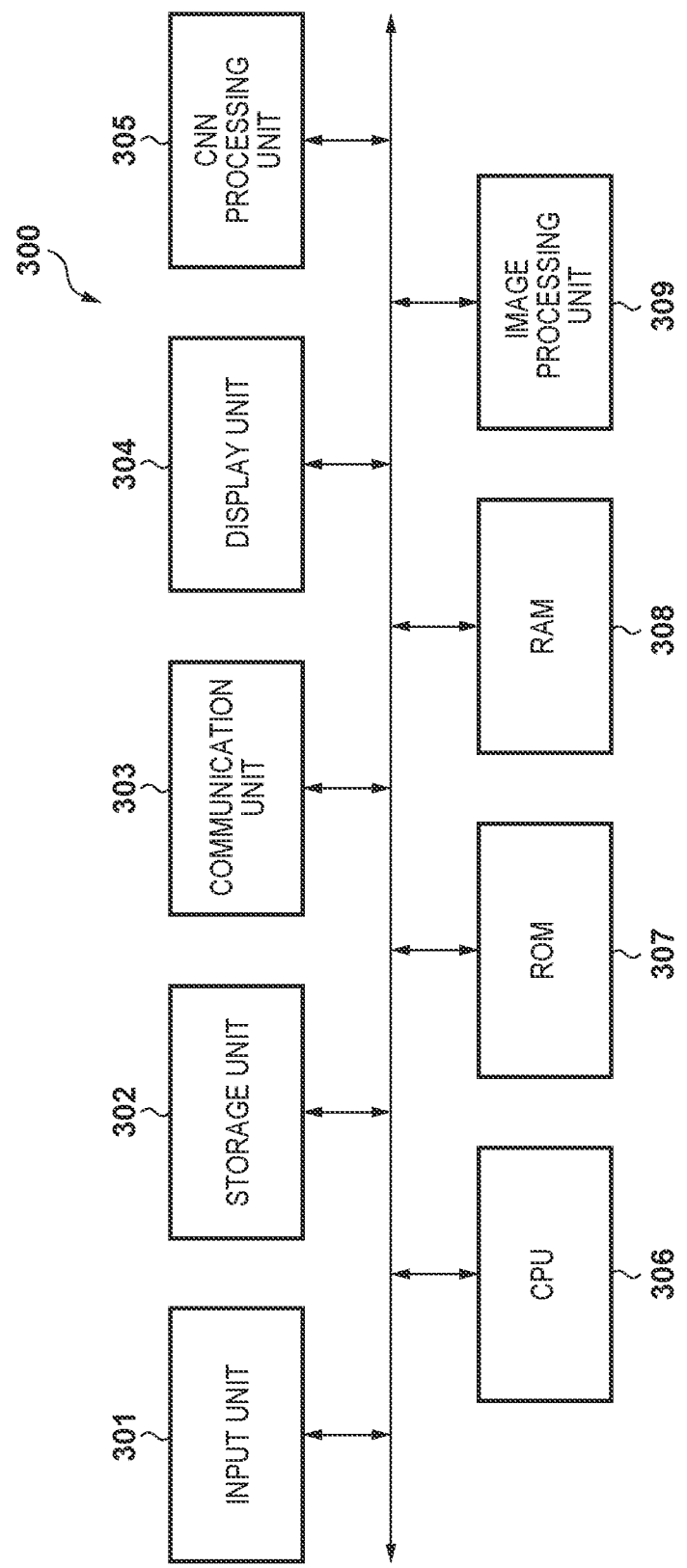
FIG. 3 is a block diagram illustrating an example of the configuration of an image processing apparatus according to one embodiment.

One embodiment of the present invention relates to a processing apparatus that performs operations in a convolutional neural network. An image processing apparatus that processes images using such a processing apparatus will be described first. FIG. 3 is a block diagram illustrating an example of the configuration of an image processing apparatus 300.

A storage unit 302 can store image data. In addition to image data, the storage unit 302 may store programs or other data. The storage unit 302 may be a hard disk, a flexible disk, a CD-ROM, a CD-R, a DVD, a memory card, a CF card, SmartMedia, an SD card, a Memory Stick, an xD-Picture Card, USB memory, or the like, for example. A part of RAM 308, which will be described later, can also be used as the storage unit 302. Furthermore, the storage unit 302 may be configured virtually, e.g., a storage apparatus included in an external device connected by a communication unit 303 (described later) may be used as the storage unit 302.

A display unit 304 is an apparatus that displays images from before or after image processing, or images such as a GUI. For example, a CRT, a liquid crystal display, or the like can be used as the display unit 304. The display unit 304 may be a display apparatus outside the image processing apparatus 300, connected by a cable or the like.

An input unit 301 is an apparatus that accepts instructions or data from a user. The input unit 301 is a keyboard, a pointing apparatus, buttons, or the like, for example. Note that the display unit 304 and the input unit 301 may be the same apparatus. For example, a touchscreen apparatus may function as both the display unit 304 and the input unit 301, in which case inputs to the touchscreen can be treated as inputs to the input unit 301.

A CPU 306 controls the operations of the image processing apparatus 300 as a whole. ROM 307 and the RAM 308 provide the CPU 306 with programs, data, work areas, and the like necessary for processing by the image processing apparatus 300. If a program required for the processing described below is stored in the storage unit 302 or the ROM 307, the program is loaded into the RAM 308 and then executed. If the image processing apparatus 300 has received the program via the communication unit 303, the program is loaded into the RAM 308 after being recorded into the storage unit 302, or is loaded directly into the RAM 308 from the communication unit 303, and is then executed. Although only one CPU 306 is illustrated in FIG. 3, the image processing apparatus 300 may have a plurality of CPUs.

An image processing unit 309 can read out image data written into the storage unit 302, perform processing for adjusting a range of pixel values on the image data, and write the resulting image data into the RAM 308, in response to commands from the CPU 306.

A CNN processing unit 305 corresponds to a processing apparatus that performs operations in a convolutional neural network. The CNN processing unit 305 can perform operations in the convolutional neural network on a processing target image stored in the RAM 308 or the like. Specifically, the CNN processing unit 305 can perform convolution processing including product-sum operations on the image data stored in the RAM 308 according to the flowchart illustrated in FIGS. 1A to 1B and described later (filter processing; steps S101 to S116). The CNN processing unit 305 then outputs the obtained result to the storage unit 302 (or the RAM 308).

The CPU 306 can perform image processing on the processing target image on the basis of a processing result obtained by performing the operations in the convolutional neural network on the processing target image. For example, on the basis of the result of the convolution processing, the CPU 306 can perform image processing such as image correction processing or image recognition processing on image data (a still image, or a moving image constituted by a plurality of frame images). The CPU 306 can store the obtained result of the image processing in the RAM 308. According to the present embodiment, the processing by the CNN processing unit 305 can be performed efficiently, which makes it possible to reduce the time from when the processing target image is input to the image processing apparatus 300 to when the CPU 306 completes the image processing on the processing target image. As such, the image processing apparatus according to the present embodiment is advantageous for processing images in real time.

The communication unit 303 is an interface (I/F) for communicating among devices. FIG. 3 illustrates the input unit 301, the storage unit 302, and the display unit 304 as all being included within a single image processing apparatus 300. However, these distributed units may be connected by communication channels using predetermined communication methods to form an image processing system. The image processing apparatus 300 may include various constituent elements aside from those described above, but those units will not be described here.

Network Configuration

Figure 2:
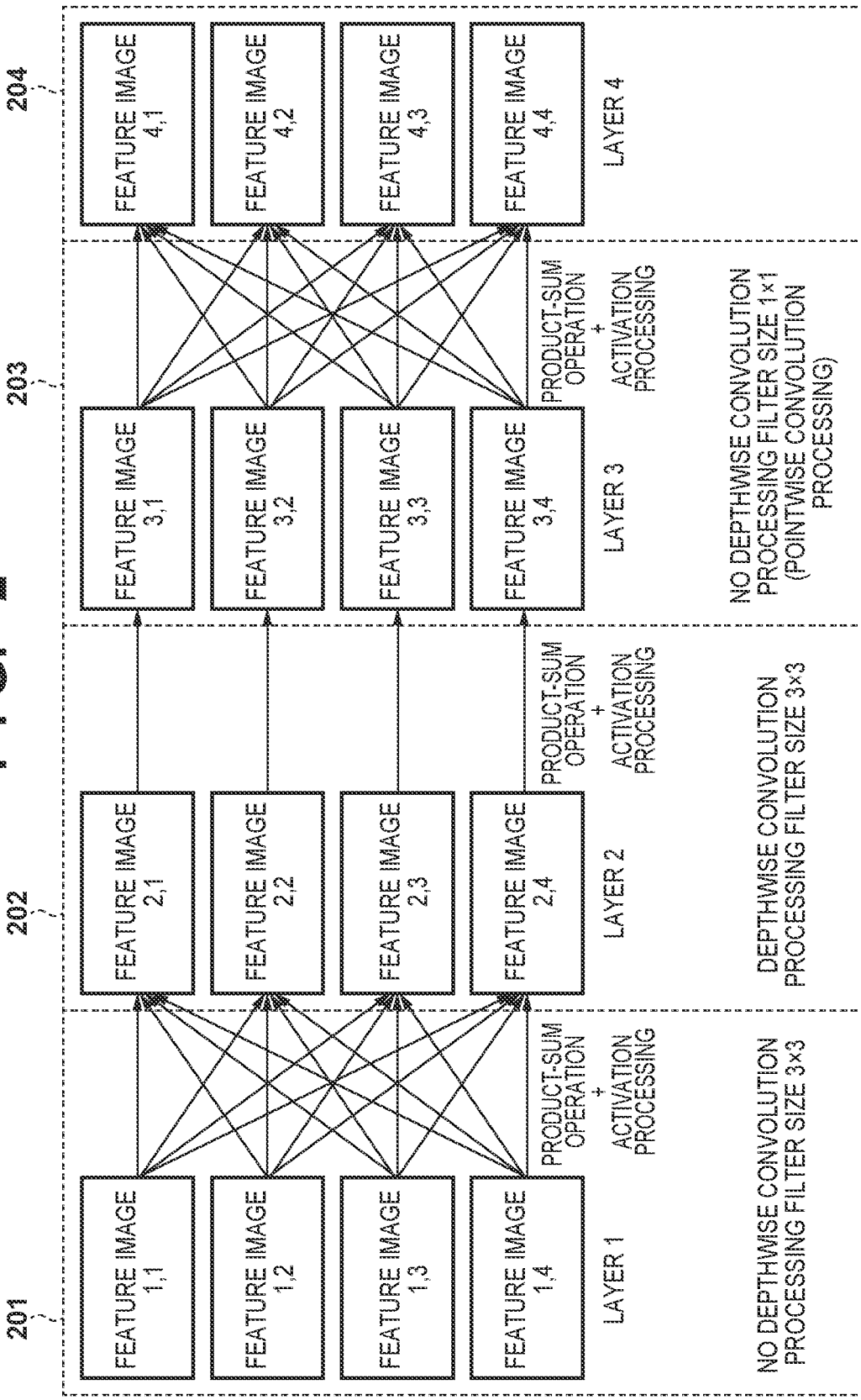
FIG. 2 is a diagram illustrating an example of the structure of a convolutional neural network according to one embodiment.

FIG. 2 illustrates an example of the structure of a convolutional neural network (this may simply be called a "network" hereinafter). The network includes a plurality of layers, and each layer contains one or more channels of data (e.g., one or more feature images). Data of a later layer is generated by performing predetermined processing on data of a previous layer. In a convolutional neural network, processing including convolution processing is performed on the data in at least one target layer to generate data for the next layer after the target layer. Although the data of each layer is not limited to an image, the following will describe a case where the operations in the convolutional neural network are performed on a processing target image. In this case, the data in the target layer in the middle of the network is a feature image obtained in the process of performing the operations in the convolutional neural network.

A processing apparatus according to one embodiment of the present invention can perform operations in a network having such a structure. The network structure can be represented by information in each layer (the computational amount of product-sum operations, the size and number of feature images, the type of processing, and the like). There are four layers in the network illustrated in FIG. 2, which will be called layers 1 to 4. Each layer has four channels, and each channel contains a single feature image. Furthermore, each feature image contains a plurality of pieces of feature data (e.g., pixel data of each pixel in the feature image).

In the operations performed in the network, convolution processing is performed using filter weighting coefficients obtained through learning and pixel data of the feature images. Convolution processing is product-sum operations, and includes multiple multiplications and cumulative additions. The arrows in FIG. 2 represent the product-sum operations.

Convolution processing for computing the feature image in the next layer after the target layer is performed using the feature image from the target layer and coefficients corresponding to the target layer. In many convolutional processes, the information of a plurality of feature images from the target layer is used for computing a single feature image. Such product-sum operations can be performed according to Expression (1).

$$O_{i,j}(n) = \sum_{m=1}^{IC} \sum_{x=0}^{X-1} \sum_{y=0}^{Y-1} (I_{i+x,j+y}(m) \times W_{x,y}(m, n)) \quad (1)$$

In the above expression, the variable n represents the number of the feature image in the next layer, and the variable m represents the number of the feature image in the target layer. There are IC feature images in the target layer, such that the mth feature image is represented by I(m), and $I_{i,j}(m)$ represents feature data (a pixel value) at coordinates (i,j) of the mth feature image. There are X×Y filter weighting coefficients ($W_{0,0}(m,n)$ to $W_{X-1,Y-1}(m,n)$), and these differ depending on the feature image to be computed. The number of product-sum operations for computing the feature data of the next layer is therefore IC×X×Y. $O_{i,j}(n)$ represents a product-sum operation result for each unit of feature data, and O(n) represents a result of the convolution processing on the entire feature image of the target layer, including a plurality of $O_{i,j}(n)$. The variable i,j represents coordinates of the feature data. After the convolution processing, the feature image of the next layer is obtained by performing activation processing, pooling processing, or the like, using the product-sum operation results $O_{i,j}(n)$, on the basis of the network structure.

In pointwise convolution processing, the number of filter weighting coefficients in Expression (1) ($W_{0,0}(m,n)$ to $W_{X-1,Y-1}(m,n)$) is 1×1. On the other hand, in depthwise convolution processing, the expression for the product-sum operation is given by Expression (2).

$$O_{i,j}(n) = \sum_{x=0}^{X-1} \sum_{y=0}^{Y-1} (I_{i+x,j+y}(n) \times W_{x,y}(n)) \quad (2)$$

In depthwise convolution processing, only one feature image from the target layer is needed to generate the feature image of the next layer, and thus the variable n can be substituted for the variable m, and the variable m can be omitted. In Expression (2), X×Y filter weighting coefficients ($W_{0,0}(n)$ to $W_{X-1,Y-1}(n)$) are used, and this is 1/IC times the number of filter weighting coefficients used in Expression (1). The number of product-sum operations for computing the feature data of the next layer is therefore X×Y, which is 1/IC times the computational amount of Expression (1).

Figure 9:
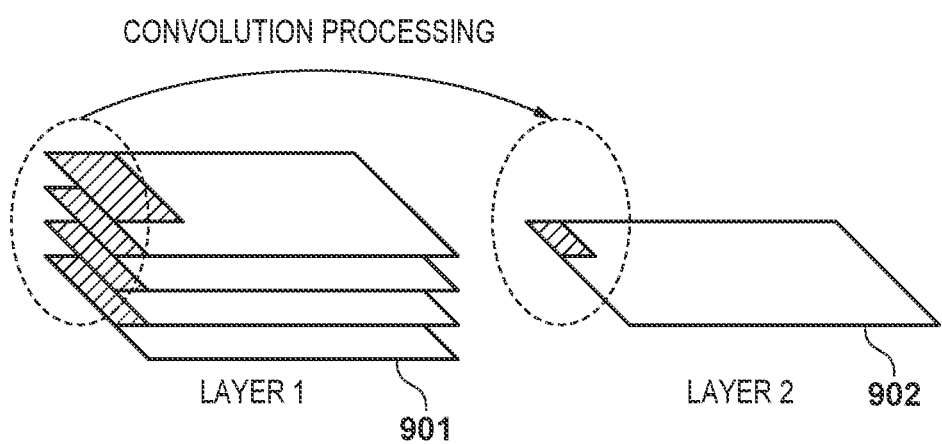
FIG. 9 is a diagram illustrating a relationship between a convolutional neural network and convolution processing.

FIG. 2 also indicates the type of convolution processing corresponding to each layer in the network, as well as the size of a filter used in the convolution processing. The convolution processing in layer 1 is convolution processing using a filter having a size of 3×3. The convolution processing in layer 1 is not depthwise convolution processing, and each feature image from layer 1 is used to generate a single feature image in layer 2. Specifically, by performing convolution processing using a plurality of feature images 201 and filter weighting coefficients in layer 1 on the basis of Expression (1), a plurality of feature images 202 of layer 2 are generated. FIG. 9 illustrates an example of the network and the convolution processing. Feature data is extracted from the same position in four feature images 901 in layer 1, and a product-sum operation is performed using the extracted feature data. The result is feature data from the same position in a feature image 902 in layer 2.

The convolution processing in layer 2 is also convolution processing using a filter having a size of 3×3. However, the convolution processing in layer 2 is depthwise convolution processing, and this one feature image from layer 2 is used to generate a single feature image in layer 3. In this manner, the computational amount of the convolution processing in layer 2 is lower than in layer 1. Specifically, by performing convolution processing using a plurality of feature images 202 and filter weighting coefficients in layer 2 on the basis of Expression (2), a plurality of feature images 203 of layer 3 are generated.

The convolution processing in layer 3 is not depthwise convolution processing, but the size of the filter used is 1×1. Specifically, by performing convolution processing using a plurality of feature images 203 and filter weighting coefficients in layer 3 on the basis of Expression (1), a plurality of feature images 204 of layer 4 are generated. In this manner, the filters and feature images are structured in layers, and the type of the convolution processing and the filter size may differ from layer to layer. Additionally, the computational processing in the network can be performed in the order of the layers.

Configuration of Processing Apparatus

Figure 4:
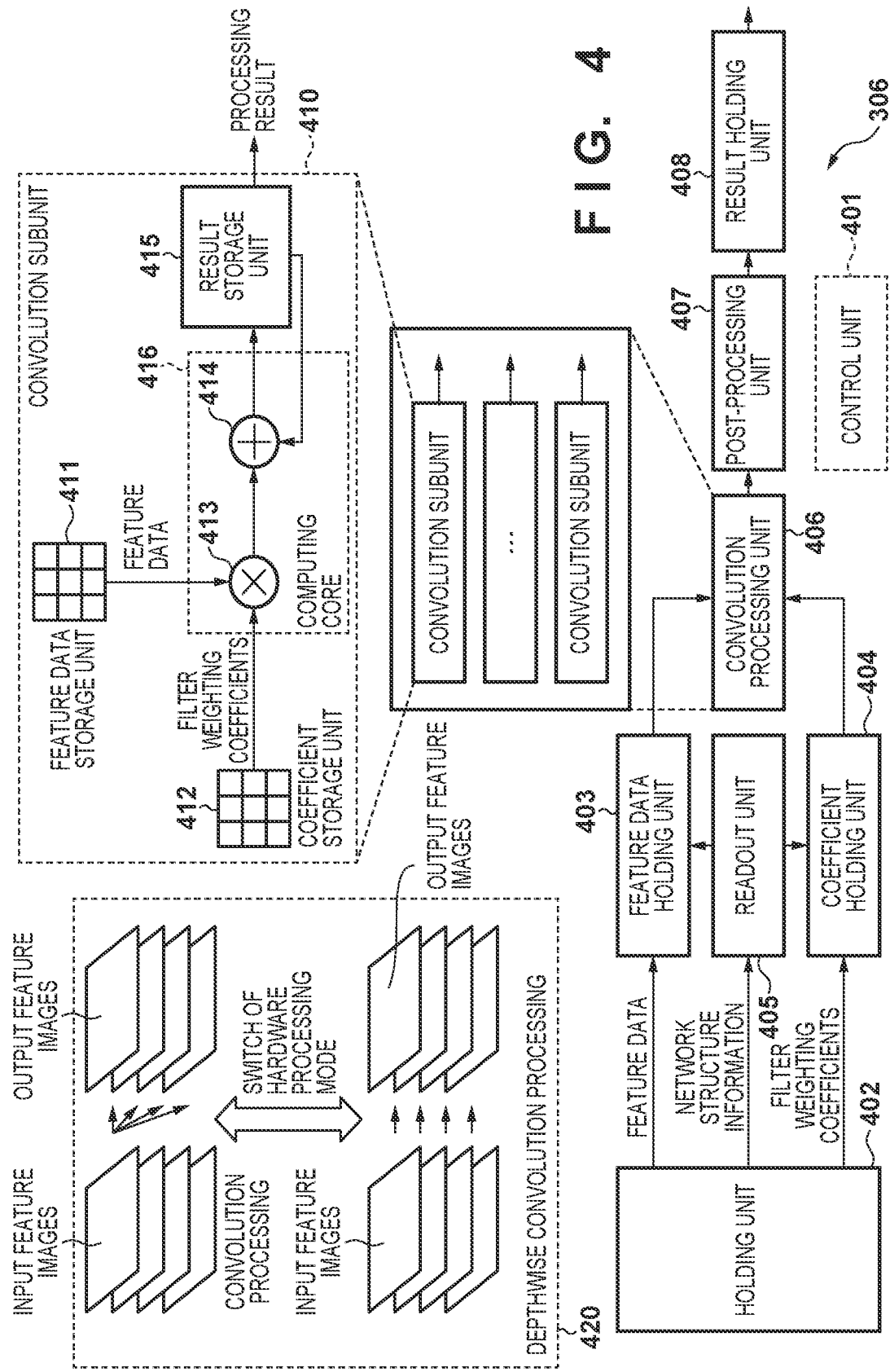
FIG. 4 is a block diagram illustrating an example of the configuration of a processing apparatus according to one embodiment.

An example of the configuration of a processing apparatus according to one embodiment of the present invention will be described next with reference to FIG. 4. The lower part of FIG. 4 illustrates the configuration of the CNN processing unit 305, which is the processing apparatus according to one embodiment of the present invention. The CNN processing unit 305 includes a control unit 401, a holding unit 402, a feature data holding unit 403, a coefficient holding unit 404, a readout unit 405, a convolution processing unit 406, a post-processing unit 407, and a result holding unit 408.

The holding unit 402 can hold the feature images (feature data), the filter weighting coefficients, and network structure information. For example, the holding unit 402 can read out all of the input feature images (e.g., all of the feature images 201 of layer 1) from the storage unit 302 or the RAM 308 and hold those images. Additionally, the holding unit 402 can read out feature images obtained by the convolution processing unit 406 and the post-processing unit 407 (e.g., all the feature images 202 of layer 2) from the result holding unit 408 and hold those images. Furthermore, the holding unit 402 can read out all the filter weighting coefficients used in the convolution processing from the storage unit 302 and hold those coefficients. The network structure information is information expressing the structure of the network, and can be read out from the storage unit 302. In the following descriptions, the network structure information includes information on the number of channels in each layer and information specifying the processing performed in each layer. The information specifying the processing performed in each layer can indicate the type of the convolution processing. i.e., whether or not depthwise convolution processing is to be performed.

The feature data holding unit 403 holds at least some of the data of the plurality of channels in the target layer. In the present embodiment, the feature data holding unit 403 holds the feature image I(m) of the target layer. The feature images used in one step of processing (described later) are transferred to the feature data holding unit 403 from the holding unit 402. The coefficient holding unit 404 can hold at least some of the coefficients used in the product-sum operations of the target layer. In the present embodiment, the coefficient holding unit 404 holds filter weighting coefficients $W_{x,y}(m, n)$ of the filter used in the convolution processing. As illustrated in FIG. 2, the filter size can be set on a layer-by-layer basis. The filter weighting coefficients used in one step of processing (described later) are transferred to the coefficient holding unit 404 from the holding unit 402. At least one of the feature data holding unit 403 and the coefficient holding unit 404 may be memory, and the memory may be provided on the same chip as the convolution processing unit 406 or a computing core 416.

The convolution processing unit 406 calculates a result of the convolution processing using the filter weighting coefficients and the feature data, on the basis of Expression (1) or Expression (2). The upper part of FIG. 4 illustrates the configuration of the convolution processing unit 406 in detail. The convolution processing unit 406 includes a plurality of convolution subunits 410. Each of the convolution subunits 410 performs product-sum operations using the data of one channel of the target layer and the coefficients corresponding to the target layer, in parallel with the others. Each convolution subunit 410 includes the computing core 416, a feature data storage unit 411, a coefficient storage unit 412, and a result storage unit 415, and has a function of accumulating the products of the feature data and the filter weighting coefficients. The computing core 416 has a multiplier 413 and an adder 414 used for the product-sum operations.

For example, when performing convolution processing on a single feature image, the feature data of the feature image and the filter weighting coefficients used in the convolution processing are supplied in sequence to the feature data storage unit 411 and the coefficient storage unit 412, respectively, by the readout unit 405. In other words, the feature data and filter weighting coefficients necessary to calculate the data of one pixel of an image representing the result of the convolution processing are supplied to the feature data storage unit 411 and the coefficient storage unit 412. The multiplier 413 is supplied with one piece of feature data and one filter weighting coefficient each from the feature data storage unit 411 and the coefficient storage unit 412. Then, the data of one pixel of the image expressing the result of the convolution processing is calculated by the adder 414 accumulating the products of the feature data and the filter weighting coefficients calculated by the multiplier 413. The result storage unit 415 can store the cumulative values of the products calculated by the multiplier 413, for each pixel in the image expressing the result of the convolution processing. The data of each pixel in the image expressing the result of the convolution processing is calculated by repeating such processing for each pixel in the image expressing the result of the convolution processing.

The post-processing unit 407 generates a feature image I(n) of the next layer on the basis of the result of the convolution processing, calculated by the convolution processing unit 406. For example, the post-processing unit 407 can perform activation processing and pooling processing on the result of the convolution processing. Note, however, that a processing unit aside from the post-processing unit 407, such as the CPU 306, may perform the activation processing or the pooling processing. Additionally, the activation processing, the pooling processing, or both may be omitted. The result holding unit 408 holds the processing result from the post-processing unit 407, i.e., the feature image I(n) of the next layer.

The readout unit 405 selects whether to perform first processing, in which an input is made to one of the convolution subunits 410 of the plurality of convolution subunits 410, or second processing, in which an input is made to each of the plurality of convolution subunits 410 in parallel. The readout unit 405 makes this selection on the basis of information specifying the processing in the target layer. The information specifying the processing in the target layer is indicated by the network structure information obtained by the readout unit 405 from the holding unit 402. For example, the readout unit 405 selects whether to perform the convolution processing according to Expression (1) or the depthwise convolution processing according to Expression (2) in accordance with the network structure, as indicated by a box 420.

The readout unit 405 can also perform data supply control for supplying data to the plurality of convolution subunits 410 from the feature data holding unit 403 and the coefficient holding unit 404. When performing the convolution processing according to Expression (1), the readout unit 405 selects the second processing. In this case, the readout unit 405 performs control such that the data of one channel in the target layer (e.g., the feature image I(m)) is input into each of the plurality of convolution subunits 410. Meanwhile, when performing the convolution processing according to Expression (2), the readout unit 405 selects the first processing. In this case, the readout unit 405 performs control such that the data of one channel in the target layer (e.g., the feature image I(m)) is input into one of the plurality of convolution subunits 410. The readout unit 405 can designate an address of the data, within the feature data holding unit 403, that is to be input to the convolution subunits 410 or the computing core 416. Specifically, the readout unit 405 can control the readout of the feature data and the filter weighting coefficients by generating an in-memory address for accessing specific data in the feature data holding unit 403 and the coefficient holding unit 404, and transferring the address to the convolution subunits 410. The readout unit 405 functioning as such an address issuing unit may be provided on the same chip as the convolution subunits 410 or the computing core 416.

Figure 1B:
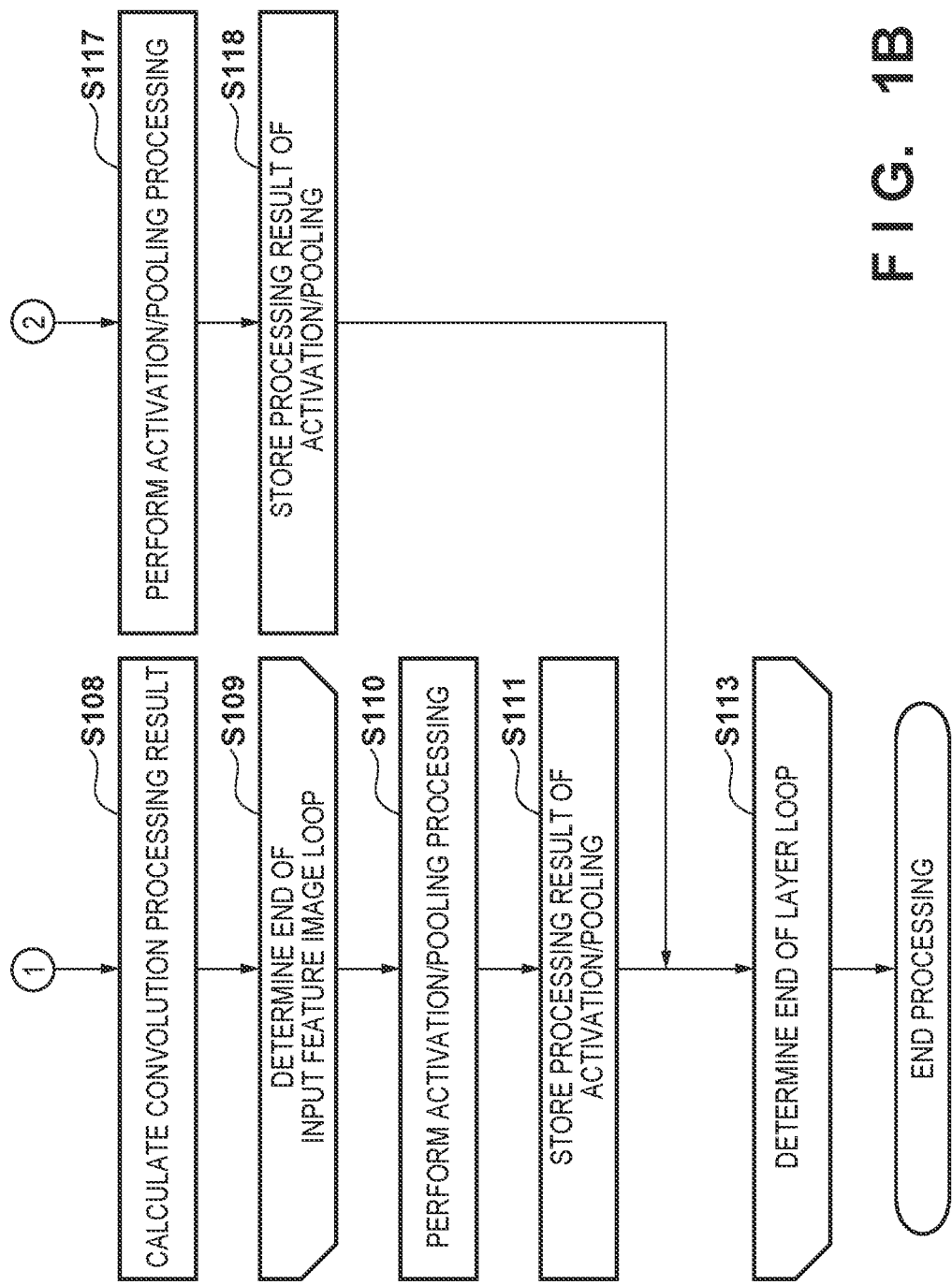

The flow of processing performed by the CNN processing unit 305 will be described next with reference to the flowchart in FIGS. 1A and 1B. Steps S101 to S116 described hereinafter can be performed by a CPU, a sequence, or the like included in the control unit 401. Each of the plurality of feature images in the target layer will be called an "input feature image" below. Likewise, each of the plurality of feature images in the layer following the target layer, generated by performing the processing of the target layer, will be called an "output feature image".

In step S101, the control unit 401 reads out input images which are targets of the operations with the network (e.g., a plurality of feature images from layer 1), the filter weighting coefficients, and the network structure information from the RAM 308, and holds those items in the holding unit 402.

In step S102, the control unit 401 starts a loop for the layer. In the first loop, the first layer (layer 1) is selected as the target layer. In the subsequent loops, the next layer (layer 2 and on) are selected as the target layer.

In step S103, the control unit 401 determines whether or not to perform depthwise convolution processing on the basis of the network structure information held in the holding unit 402. If the depthwise convolution processing is not to be performed, the sequence moves to step S105. However, if the depthwise convolution processing is to be performed, the sequence moves to step S114.

In step S105, the control unit 401 initializes each result storage unit 415 which stores the result of the convolution processing. The control unit 401 can perform this initialization by setting a processing result held in the result storage unit 415 to zero.

In step S106, the control unit 401 starts a loop for the input feature image. In the first loop, processing is performed using the first input feature image as a processing target. In the subsequent loops, processing using the next input feature image (the second and on) is performed.

In step S107, the control unit 401 reads out some of the input feature images from the holding unit 402, and transfers those feature images to the feature data holding unit 403. The control unit 401 also reads out some of the filter weighting coefficients from the holding unit 402 and transfers those filter weighting coefficients to the coefficient holding unit 404. As described above, the control unit 401 can transfer the feature images and filter weighting coefficients used in one step of the processing to the feature data holding unit 403 and the coefficient holding unit 404. Here, "one step of processing" refers to the convolution processing in step S108, or the convolution processing in step S116, in a single loop for the input feature image. If depthwise convolution processing is not to be performed, in step S108, a single common input feature image and a plurality of sets of filter weighting coefficients corresponding to each instance of convolution processing are used. As such, the control unit 401 can transfer a single input feature image, which is the target of the processing in the loop of from step S106 to S109, to the feature data holding unit 403. The control unit 401 can also transfer, to the coefficient holding unit 404, the filter weighting coefficients of the convolution processing performed on the single input feature image that is the target of the processing. Although the filter weighting coefficients and the feature image can be transferred in parallel to shorten the transfer time, the filter weighting coefficients and the input image may instead be transferred in sequence when there is insufficient transfer bandwidth, for example.

In step S108, the convolution processing unit 406 performs convolution processing using the input feature image held in feature data holding unit 403 and the filter weighting coefficients held in the coefficient holding unit 404, in accordance with a control signal from the control unit 401. In the present embodiment, a common input feature image, which is the target of the processing, is input to each of the plurality of convolution subunits 410. Additionally, mutually-different filter weighting coefficients can be input to the respective plurality of convolution subunits 410. Filter weighting coefficients of convolution processing for generating a corresponding output feature image, from among the plurality of output feature images, are input to a single convolution subunit 410. In this manner, the convolution subunits 410 can perform the convolution processing on a common input feature image in parallel using different filter weighting coefficients.

To describe this in more detail, the feature data storage unit 411 and the coefficient storage unit 412 store specific feature data and filter weighting coefficients, which are stored in the feature data holding unit 403 and the coefficient holding unit 404, under the control of the readout unit 405. Each computing core 416 can perform a product-sum operation by calculating the product of a single piece of data and a single coefficient which have been input and then totaling the calculated products. Accordingly, the supply of data from the feature data storage unit 411 and the coefficient storage unit 412 is controlled such that the data and coefficients are input one at a time to each of the plurality of computing cores 416. The data of a single pixel in the image expressing the result of the convolution processing can be calculated by repeating the product-sum operations using the feature data and the filter weighting coefficients stored in the feature data storage unit 411 and the coefficient storage unit 412. The readout unit 405 can control the order of the readout of the feature data and the filter weighting coefficients from the feature data holding unit 403 and the coefficient holding unit 404 such that a result of convolution processing on the input feature image is obtained.

In step S109, the control unit 401 determines the end of the loop for the input feature image. If the processing is not yet finished for all of the input feature images, the sequence returns to step S107, and the processing is performed using the next input feature image. In this manner, the parallel input of the data of a single common channel from the feature data holding unit 403 to the plurality of convolution subunits 410, performed in step S107, is repeated for the data in each of the plurality of channels in the target layer.

If the processing has ended for all of the input feature images in step S109, the sequence moves to step S110. At this time, each of the convolution subunits 410 outputs a computation result corresponding to one channel in the next layer after the target layer, using the data of the corresponding channel in the target layer which has been input in sequence. In other words, a single convolution subunit 410 performs convolution processing for each of the plurality of input feature images in the corresponding loop, and stores the results of that processing in the result storage unit 415. In this manner, the result storage unit 415 can store data obtained by accumulating the results of the convolution processing performed for each of the plurality of input feature images. The data stored by the result storage unit 415 corresponds to the results of convolution processing using a filter having a dimension in the channel (depth) direction (e.g., pointwise convolution processing or three-dimensional convolution processing using a 3×3×3 filter), performed on the plurality of input feature images.

In step S110, the post-processing unit 407 performs activation processing on the basis of the results of the convolution processing stored in the result storage unit 415, in accordance with the control signal from the control unit 401. The post-processing unit 407 can calculate a result of the activation processing according to Expression (3), for example.

$$f(x)=0(x<0)\ x(x\geq 0) \tag{3}$$

In Expression (3), f(x) represents an activation function, and x represents the input data. Although a Rectified Linear Unit (ReLU) is used as the activation function in this example, the activation function is not limited to ReLU. For example, another nonlinear function, or a quantization function, may be used as the activation function. Additionally, the post-processing unit 407 may adjust the size of the output feature image by performing pooling processing on the basis of the result of the activation processing, in accordance with layer information indicated by the network structure information.

The post-processing unit 407 can generate the output feature image and store the image in the result holding unit 408 by performing such processing on the results of the convolution processing stored in the result storage unit 415. The post-processing unit 407 can perform such processing on the results of the convolution processing stored in each of the plurality of result storage units 415. As a result, a plurality of output feature images, each corresponding to a result of the convolution processing stored in corresponding ones of the plurality of result storage units 415, are stored in the result holding unit 408.

In step S111, the control unit 401 stores the output feature image stored in the result holding unit 408 in the holding unit 402. This output feature image is the feature image of the next layer after the target layer.

In step S113, the control unit 401 determines the end of the layer loop. If the processing is complete for all of the layers, the convolution processing ends. If not, the sequence returns to step S103, where the target layer is changed and the processing for the next layer is started. In this case, the output feature image stored in the holding unit 402 in step S111 is used as the input feature image in the processing for the next layer.

In step S114, the control unit 401 initializes each of the result storage units 415, in the same manner as in step S105.

In step S115, the control unit 401 reads out some of the input feature images from the holding unit 402, and transfers those feature images to the feature data holding unit 403. The control unit 401 also reads out some of the filter weighting coefficients from the holding unit 402 and transfers those filter weighting coefficients to the coefficient holding unit 404. If depthwise convolution processing is to be performed, in step S116, a plurality of input feature images and a plurality of sets of filter weighting coefficients corresponding to the input feature images are used. As such, the control unit 401 can transfer a plurality of input feature images, which are the targets of the processing in step S116, to the feature data holding unit 403. The control unit 401 can also transfer the plurality of sets of filter weighting coefficients to the coefficient holding unit 404. As in step S107, the filter weighting coefficients and the feature images may be transferred in parallel, or in sequence.

In step S116, the convolution processing unit 406 performs convolution processing using the input feature images held in feature data holding unit 403 and the filter weighting coefficients held in the coefficient holding unit 404, in accordance with a control signal from the control unit 401. In the present embodiment, the data of a plurality of channels in the target layer, stored in the feature data holding unit 403, is input in parallel to the plurality of convolution subunits 410, such that the data of a single channel is input to a corresponding single convolution subunit 410. In this manner, mutually-different input feature images are input to corresponding ones of the plurality of convolution subunits 410. Additionally, mutually-different filter weighting coefficients can be input to the respective plurality of convolution subunits 410. In this manner, the convolution subunits 410 can perform the convolution processing on mutually-different input feature images in parallel using mutually-different filter weighting coefficients. The readout unit 405 can control the readout order of the feature data and the filter weighting coefficients from the feature data holding unit 403 and the coefficient holding unit 404 in the same manner as in step S108, with the exception of different data being used in the convolution processing. The computing core 416 can also perform the product-sum operation in the same manner as in step S108. In this manner, each of the plurality of convolution subunits 410 outputs a computation result corresponding to one channel in the next layer after the target layer, using the data of the corresponding one channel in the target layer.

Steps S117 and S118 can be performed in the same manner as steps S110 and S111, and the output feature image is generated and stored.

As described above, when depthwise convolution processing is to be performed, the loop of steps S106 to S109 can be omitted, which makes it possible to improve the processing efficiency.

Example of Convolution Processing

According to the configuration of the present embodiment, a plurality of feature images can be processed in parallel. The processing involved in the flowchart illustrated in FIGS. 1A and 1B will be described further with reference to the examples illustrated in FIGS. 5A to 5E. FIGS. 5A to 5E illustrate the processing of two layers illustrated in FIG. 2 (layer 2 and layer 3). An example in which four feature images are processed in parallel will be described here. In FIGS. 5A to 5E, the solid line blocks indicate processing targets in each step, and the solid line arrows indicate convolution processing performed in each step.

FIG. 5A illustrates the processing of layer 2. In step S103, it is determined that depthwise convolution processing is to be performed, and the sequence moves to step S114. In step S116, each of the four input feature images is input in parallel to corresponding ones of the plurality of convolution subunits 410. Each of the plurality of convolution subunits 410 performs depthwise convolution processing on the corresponding input feature image, and four output feature images are generated in parallel as a result. The convolution processing of layer 2 is completed in one step.

FIGS. 5B to 5E illustrate the processing of layer 3. In step S103, it is determined that depthwise convolution processing is not to be performed, and the sequence moves to step S105. Then, the four input feature images are input in parallel to the plurality of convolution subunits 410 as a common input feature image, one at a time. Each of the convolution subunits 410 repeatedly stores the processing results by performing the convolution processing on the four input feature images input in sequence, and the four output feature images are processed in parallel as a result. In other words, one of the convolution subunits 410 performs the convolution processing on feature image (3,1), feature image (3,2), feature image (3,3), and feature image (3,4) in sequence, and feature image (4,1) is generated by accumulating the processing results. The convolution processing of layer 3 is completed in four steps, and thus the processing time and computational amount required are four times those of layer 2.

Although the foregoing describes a case where the processing parallelism (the number of convolution subunits 410) and the number of output feature images are the same, the processing parallelism and the number of output feature images may be different. A case where the processing apparatus has $PE_{num}$ convolution subunits 410, and the number of output feature images is greater than the processing parallelism ($PE_{num}$), will be described as an example of when the number of output feature images is greater than the processing parallelism. First, the processing of steps S105 to S111 (or steps S114 to S118) can be performed to generate $PE_{num}$ output feature images (e.g., from a first to a $PE_{num}$th image). Then, the processing of steps S105 to S111 (or steps S114 to S118) can be repeated to generate the next $PE_{num}$ output feature images (e.g., from a $PE_{num}$+1th to a 2×$PE_{num}$th image). By repeating this processing, a number of output feature images greater than the processing parallelism can be generated. A case where the number of feature images is a multiple of the processing parallelism will be described in the third and subsequent embodiments, but the number of feature images need not be a multiple of the processing parallelism.

As described above, by determining whether or not to perform the depthwise convolution processing in step S103, both normal convolution processing and depthwise convolution processing can be performed efficiently. When performing depthwise convolution processing in particular, a plurality of processors can be used in parallel, which makes it possible to complete the processing in a shorter amount of time than with conventional techniques.

Variations of First Embodiment

The configuration of the CNN processing unit 305 is not limited to the configuration illustrated in FIG. 4. Another example of the configuration of the CNN processing unit 305 will be described with reference to FIG. 10. In this configuration example, the CNN processing unit 305 includes a plurality of feature data storage units 411, each corresponding to one of the plurality of computing cores 416. As described above, each of the plurality of computing cores 416 can perform, in parallel, product-sum operations using the data of one channel of the target layer and coefficients corresponding to the target layer. The CNN processing unit 305 according to this configuration example includes a multiplexer (MUX) which can select the inputs to the computing cores 416 from among a plurality of sources. This MUX can switch between the first processing and the second processing. The MUX may be provided on the same chip as the computing cores 416.

Figure 10:
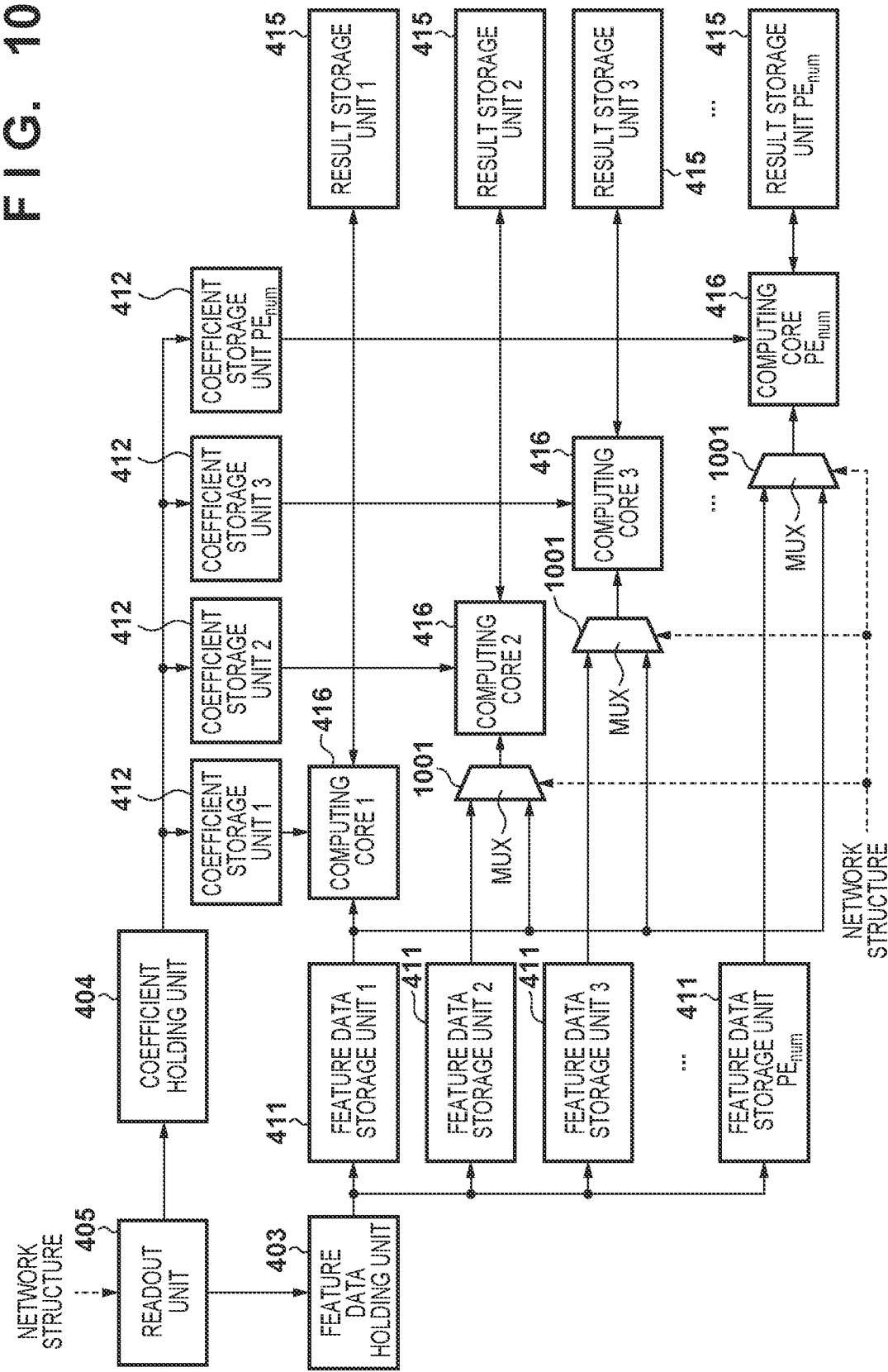
FIG. 10 is a block diagram illustrating an example of the configuration of a processing apparatus according to one embodiment.

FIG. 10 illustrates $PE_{num}$ convolution subunits 410. As illustrated in FIG. 10, a single convolution subunit 1 includes a corresponding feature data storage unit 1, coefficient storage unit 1, processing core 1, and result storage unit 1. Here, the data input to the processing core 1 is transferred to the corresponding feature data storage unit 1. Additionally, the data input to processing cores 2 to $PE_{num}$ is input to the feature data storage unit 1 or the corresponding feature data storage units 2 to $PE_{num}$, and the input source is switched by a MUX 1001. In the present variation, the MUX 1001 can select the input of feature data to some of the computing cores 416 in accordance with the network structure.

For example, in the second processing, in which depthwise convolution processing is not performed, one of the feature data storage units 411 among the plurality of feature data storage units 411 supplies the data of a single common channel in the target layer to each of the plurality of computing cores 416. In other words, the readout unit 405 transfers a single piece of feature data to the feature data storage unit 1, and transfers $PE_{num}$ sets of filter weighting coefficients to the coefficient storage units 1 to $PE_{num}$. As a result of the input selection using the MUX 1001, the inputs to the $PE_{num}$ computing cores 416 become the same, and common feature data is transferred from the feature data storage unit 1 to the processing cores 1 to $PE_{num}$. Each of the computing cores 416 performs product-sum operations using the same feature data but different filter weighting coefficients, and thus $PE_{num}$ convolution processing results are calculated.

On the other hand, in the first processing, in which depthwise convolution processing is performed, each of the plurality of feature data storage units 411 supplies the data of a single channel in the target layer to a corresponding computing core 416. In other words, the readout unit 405 transfers different feature data to the feature data storage units 1 to $PE_{num}$, and transfers $PE_{num}$ sets of filter weighting coefficients to the coefficient storage units 1 to $PE_{num}$. As a result of the input selection using the MUX 1001, the inputs to the $PE_{num}$ computing cores 416 become different, and different feature data is transferred from the feature data storage units 1 to $PE_{num}$ to the processing cores 1 to $PE_{num}$. Each of the computing cores 416 performs product-sum operations using different feature data and different filter weighting coefficients, and thus $PE_{num}$ convolution processing results are calculated.

Second Embodiment

In the first embodiment, when depthwise convolution processing is not to be performed, a common input feature image is input to the plurality of convolution subunits 410 in parallel. However, in a second embodiment, when depthwise convolution processing is not to be performed, mutually-different input feature images are input to the plurality of convolution subunits 410 in parallel so that a single output feature image is generated through parallel processing. Configurations which are different from the first embodiment will be described hereinafter. Configurations which are the same as in the first embodiment are given the same reference signs, and will not be described.

Figure 7:
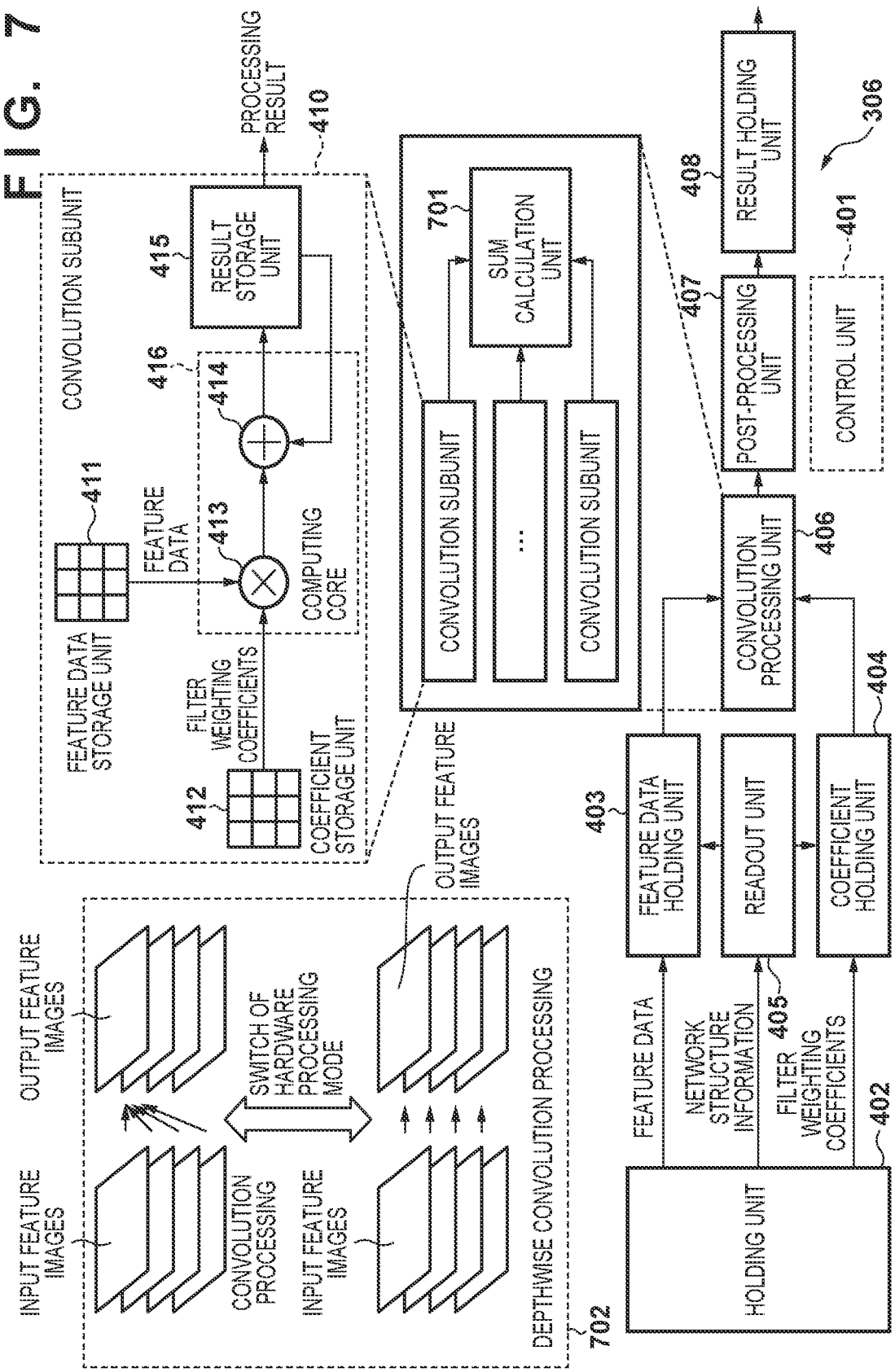
FIG. 7 is a block diagram illustrating an example of the configuration of a processing apparatus according to one embodiment.

The lower part of FIG. 7 illustrates the configuration of the CNN processing unit 305, which is the processing apparatus according to the second embodiment. The processing apparatus according to the present embodiment further includes a sum calculation unit 701 that accumulates the results of the operations performed by each of the plurality of convolution subunits 410. The sum calculation unit 701 can calculate the sum of results of convolution processing performed on a plurality of input feature images. The sum calculation unit 701 has a configuration for totaling the results of convolution processing generated in parallel, and can therefore perform the output feature image generation in parallel.

As in the first embodiment, the readout unit 405 selects whether to perform the convolution processing according to Expression (1) or the depthwise convolution processing according to Expression (2) in accordance with the network structure. However, the order of processing is different from that of the first embodiment, as indicated by a box 702.

The sum calculation unit 701 that accumulates the results of the operations performed by each of the plurality of convolution subunits 410. Additionally, the sum calculation unit 701 selects whether to perform the first processing or the second processing in accordance with information specifying the processing in the target layer. In the first processing, the result of the operations in each of the plurality of convolution subunits 410 is output as the result of operations corresponding to a corresponding channel in the target layer. If depthwise convolution processing according to Expression (2) is to be performed, the first processing is selected, and the sum calculation unit 701 outputs the result of the operations of each of the plurality of convolution subunits 410 as data corresponding to a corresponding feature image in the next layer after the target layer. Meanwhile, in the second processing, the result of operations obtained by the sum calculation unit 701 is output as a result of operations corresponding to a single channel in the next layer. If convolution processing according to Expression (1) is to be performed, the second processing is selected; the sum calculation unit 701 then accumulates the results of the operations of the plurality of convolution subunits 410, and outputs the cumulative result as data corresponding to a single feature image in the next layer.

The flow of processing performed by the CNN processing unit 305 according to the present embodiment will be described next with reference to the flowchart in FIGS. 6A and 6B. Steps S101 to S103 are the same as in the first embodiment.

Step S105 is also the same as in the first embodiment. In step S602, the control unit 401 starts a loop for the output feature image. In the first loop, processing is performed using the first output feature image as a processing target. In the subsequent loops, processing using the next output feature image (the second and on) is performed.

In step S107, the control unit 401 reads out some of the input feature images and some of the filter weighting coefficients from the holding unit 402, and transfers those items to the feature data holding unit 403 and the coefficient holding unit 404. In the present embodiment, if depthwise convolution processing is not to be performed, in step S108, a plurality of input feature images and a plurality of sets of filter weighting coefficients corresponding to the input feature images are used. As such, the control unit 401 can transfer a plurality of input feature images, which are the targets of the processing in step S108, to the feature data holding unit 403. The control unit 401 can also transfer the plurality of sets of filter weighting coefficients to the coefficient holding unit 404. Unlike the first embodiment, the number of transferred input feature images does not change depending on the result of the selection made in step S103.

In step S108, the convolution processing unit 406 performs convolution processing using the input feature image held in the feature data holding unit 403 and the filter weighting coefficients held in the coefficient holding unit 404 in the same manner as in the first embodiment, with the exception of different data being used in the convolution processing. In the present embodiment, the data of a plurality of channels in the target layer, stored in the feature data holding unit 403, is input in parallel to the plurality of convolution subunits 410, such that the data of a single channel is input to a corresponding single convolution subunit 410. In this manner, mutually-different input feature images are input to the plurality of convolution subunits 410. Additionally, mutually-different filter weighting coefficients can be input to the respective plurality of convolution subunits 410. In this manner, the convolution subunits 410 can perform the convolution processing on mutually-different input feature images in parallel using mutually-different filter weighting coefficients.

In step S108 of the present embodiment, the sum calculation unit 701 furthermore adds and accumulates the convolution processing results obtained using the input feature images and the filter weighting coefficients input from the plurality of convolution subunits 410. In this manner, the sum calculation unit 701 can generate data obtained by accumulating the results of the convolution processing performed for each of the plurality of input feature images. The data generated in this manner corresponds to the results of convolution processing using a filter having a dimension in the channel (depth) direction (e.g., pointwise convolution processing or three-dimensional convolution processing using a 3×3×3 filter), performed on the plurality of input feature images. The sum calculation unit 701 determines whether or not to calculate and output a sum of the convolution processing results in accordance with the result of the selection in step S103.

In step S605, the control unit 401 determines the end of the loop for the output feature image. If convolution processing results have not been generated for all of the output feature images, the sequence returns to step S107, and the convolution processing for generating the next output feature image is performed. If convolution processing results corresponding to all of the output feature images have been generated, the sequence moves to step S110.

In step S110, the post-processing unit 407 generates an output feature image on the basis of the convolution processing results generated by the sum calculation unit 701, in the same manner as in the first embodiment. Steps S111 to S113 are the same as in the first embodiment.

If depthwise convolution processing is to be performed, the processing of steps S114 to S118 is performed in the same manner as in the first embodiment. As described above, in step S116, the sum calculation unit 701 outputs the result of the operations of each of the plurality of convolution subunits 410 as data corresponding to a corresponding feature image in the next layer after the target layer, without calculating the sum of the convolution processing results.

Example of Convolution Processing

According to the configuration of the present embodiment as well, a plurality of feature images can be processed in parallel. The processing involved in the flowchart illustrated in FIGS. 6A and 6B will be described further with reference to the example illustrated in FIG. 8A to 8E. Like FIGS. 5A to 5E. FIGS. 8A to 8E illustrate the processing of two layers illustrated in FIG. 2 (layer 2 and layer 3).

FIG. 8A illustrates the processing of layer 2. Here, depthwise convolution processing is performed, as in the first embodiment.

FIGS. 8B to 8E illustrate the processing of layer 3. In step S103, it is determined that depthwise convolution processing is not to be performed, and the sequence moves to step S105. In FIG. 8B, four input feature images are input in parallel to the plurality of convolution subunits 410, one at a time. Each of the convolution subunits 410 performs convolution processing on the input Penult feature image, and the sum calculation unit 701 calculates a sum of the convolution processing results. A single output feature image is generated through parallel processing as a result. In other words, the convolution subunits 410 perform the convolution processing on feature image (3,1), feature image (3,2), feature image (3,3), or feature image (3,4) in parallel, and feature image (4,1) is generated by accumulating the processing results. By performing the same processing using different filter weighting coefficients, feature image (4,2), feature image (4,3), and feature image (4,4) are generated in sequence, as illustrated in FIGS. 8C to 8E. The convolution processing of layer 3 is completed in four steps, and thus the processing time and computational amount required are four times those of layer 2. Note that if there are more than four input feature images, the more than four input feature images can be input to the plurality of convolution subunits 410 in parallel.

Although the foregoing describes a case where the processing parallelism (the number of convolution subunits 410) and the number of input feature images are the same, the processing parallelism and the number of input feature images may be different. A case where the processing apparatus has $PE_{num}$ convolution subunits 410, and the number of input feature images is greater than the processing parallelism ($PE_{num}$), will be described as an example of when the number of output feature images is greater than the processing parallelism. When performing convolution processing according to Expression (1), the processing of steps S602 to S605 can be performed first to generate convolution processing results corresponding to each of the output feature images, using the $PE_{num}$ input feature images (e.g., from a first to a $PE_{num}$th image). Then, the processing of steps S602 to S605 can be repeated to generate convolution processing results corresponding to each of the output feature images, using the next $PE_{num}$ input feature images (e.g., from a $PE_{num}+1$th to a $2\times PE_{num}$th image). At this time, the results of the convolution processing using the first to $PE_{num}$th input feature images, and the results of the convolution processing using the $PE_{num}+1$th to $2\times PE_{num}$th input feature images, can be accumulated. The results of convolution processing using the first to $2\times PE_{num}$th input feature images can be obtained in this manner. An output feature image based on the results of convolution processing using all the input feature images can be obtained by repeating such processing. When performing convolution processing according to Expression (2), the processing can be performed as described in the first embodiment. Note that the number of feature images may be a multiple of the processing parallelism, but need not be a multiple of the processing parallelism.

As described above, by determining whether or not to perform the depthwise convolution processing in step S103, both normal convolution processing and depthwise convolution processing can be performed efficiently. When performing depthwise convolution processing in particular, a plurality of processors can be used in parallel, which makes it possible to complete the processing in a shorter amount of time than with conventional techniques.

Variations of Second Embodiment

Figure 6A:
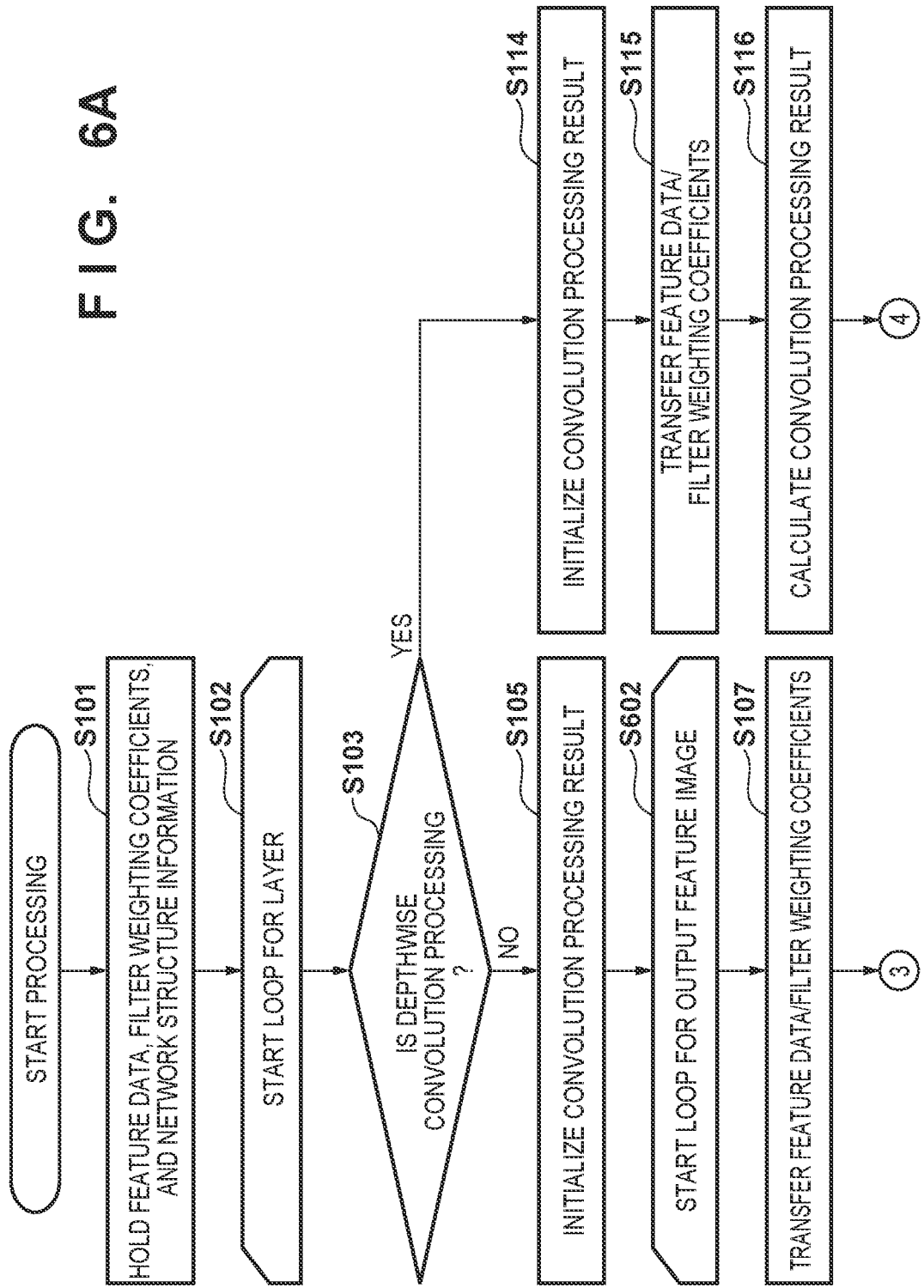

The configuration of the CNN processing unit 305 is not limited to the configuration illustrated in FIGS. 6A and 6B. Another example of the configuration of the CNN processing unit 305 will be described with reference to FIG. 11. In this configuration example, the CNN processing unit 305 includes a plurality of result storage units 415, each corresponding to one of the plurality of computing cores 416. As described above, each of the plurality of computing cores 416 can perform, in parallel, product-sum operations using the data of one channel of the target layer and coefficients corresponding to the target layer. The CNN processing unit 305 according to this configuration example includes a multiplexer (MUX) that can select one of a plurality of outputs obtained using the plurality of computing cores 416. This MUX can switch between the first processing and the second processing. The MUX may be provided on the same chip as the computing cores 416.

Figure 11:
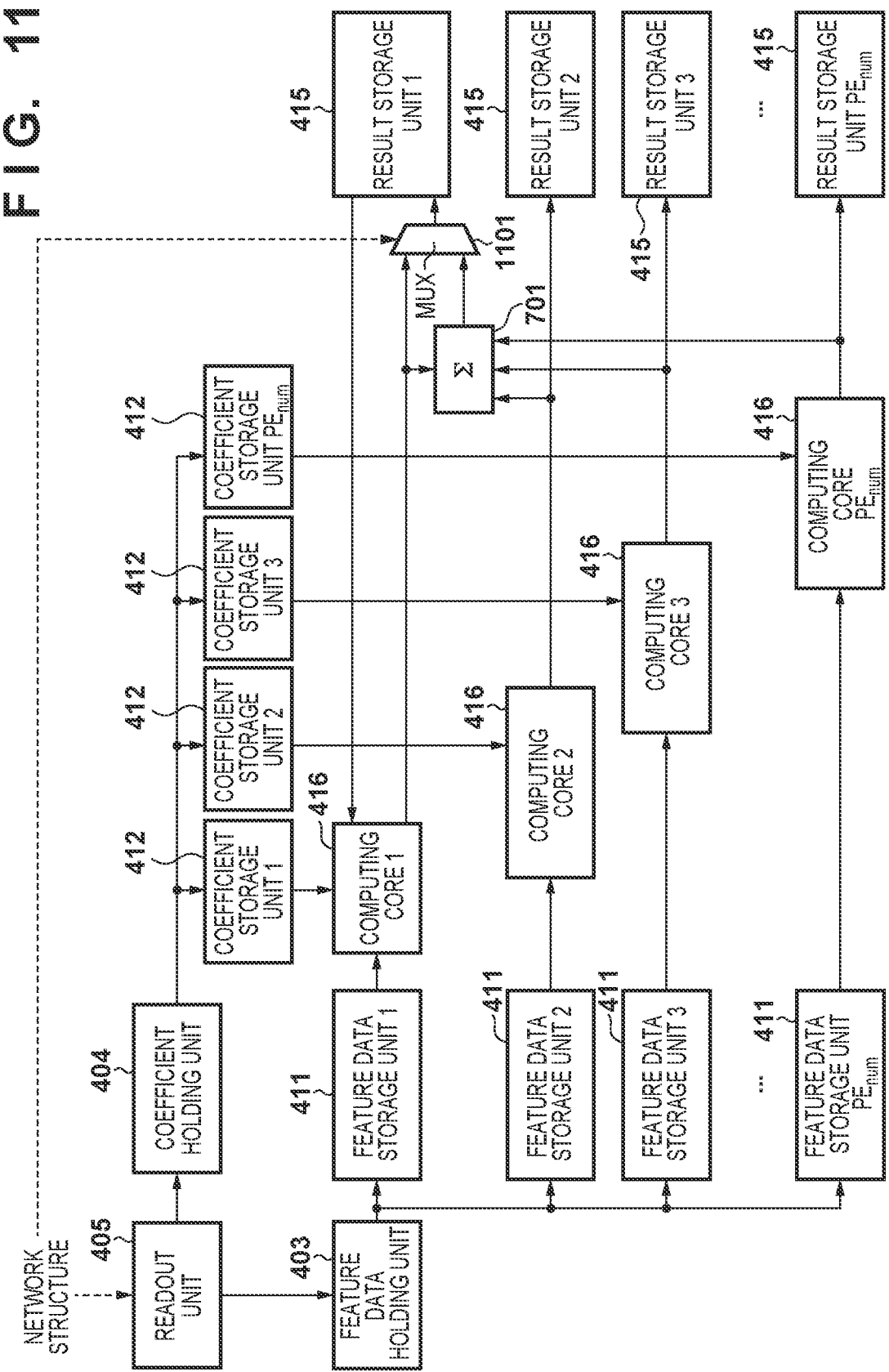
FIG. 11 is a block diagram illustrating an example of the configuration of a processing apparatus according to one embodiment.

FIG. 11 illustrates $PE_{num}$ convolution subunits 410. Each of the $PE_{num}$ convolution subunits includes a corresponding feature data storage unit, coefficient storage unit, computing core, and result storage unit. The readout unit 405 can transfer mutually-different feature data to the feature data storage units 1 to $PE_{num}$, and can transfer mutually-different filter weighting coefficients to the coefficient storage units 1 to $PE_{num}$. Here, the data input to the processing cores 1 to $PE_{num}$ is transferred to the corresponding feature data storage units 1 to $PE_{num}$. In this case, each of the $PE_{num}$ computing cores 416 calculates a result of convolution processing using the filter weighting coefficients corresponding to the input feature data, and $PE_{num}$ convolution processing results are obtained as a result. The sum calculation unit 701 adds the $PE_{num}$ convolution processing results together.

In the present variation, a MUX 1101 can select the input to the result storage unit 1 in accordance with the network structure. Specifically, an output selected from between the output from the processing core 1, and the output from the sum calculation unit 701 based on the outputs from the plurality of computing cores 416, is input to the result storage unit 1.

For example, in the second processing, in which depthwise convolution processing is not performed, each of the plurality of computing cores 416 outputs a result of operations to the sum calculation unit 701, and the sum calculation unit 701 outputs a result of totaling those results to one of the plurality of result storage units 415. In other words, as a result of input selection using the MUX 1101, the $PE_{num}$ convolution processing results added together by the sum calculation unit 701 are input to the result storage unit 1. In this case, the result storage units 2 to $PE_{num}$ are not used.

On the other hand, in the first processing, in which depthwise convolution processing is performed, each of the plurality of computing cores 416 outputs a result of operations to a corresponding result storage unit 415. In other words, as a result of the input selection using the MUX 1101, each of the $PE_{num}$ convolution processing results is input to the result storage units 1 to $PE_{num}$, respectively.

Third Embodiment

In the foregoing embodiments, the steps in FIGS. 1A to 1B or FIGS. 6A to 6B are performed in order. However, the processing according to the embodiments may be performed through pipeline processing by using hardware capable of pipeline processing. A case where the processing according to the first embodiment is performed using pipeline processing will be described next with reference to FIGS. 12A and 12B. The following will describe a case of using hardware capable of generating $PE_{num}$ output feature images in parallel. Although a case where the number of input feature images OC is $2PE_{num}$ will be described for the sake of simplicity, the number of input feature images is not particularly limited.

Figure 12A:
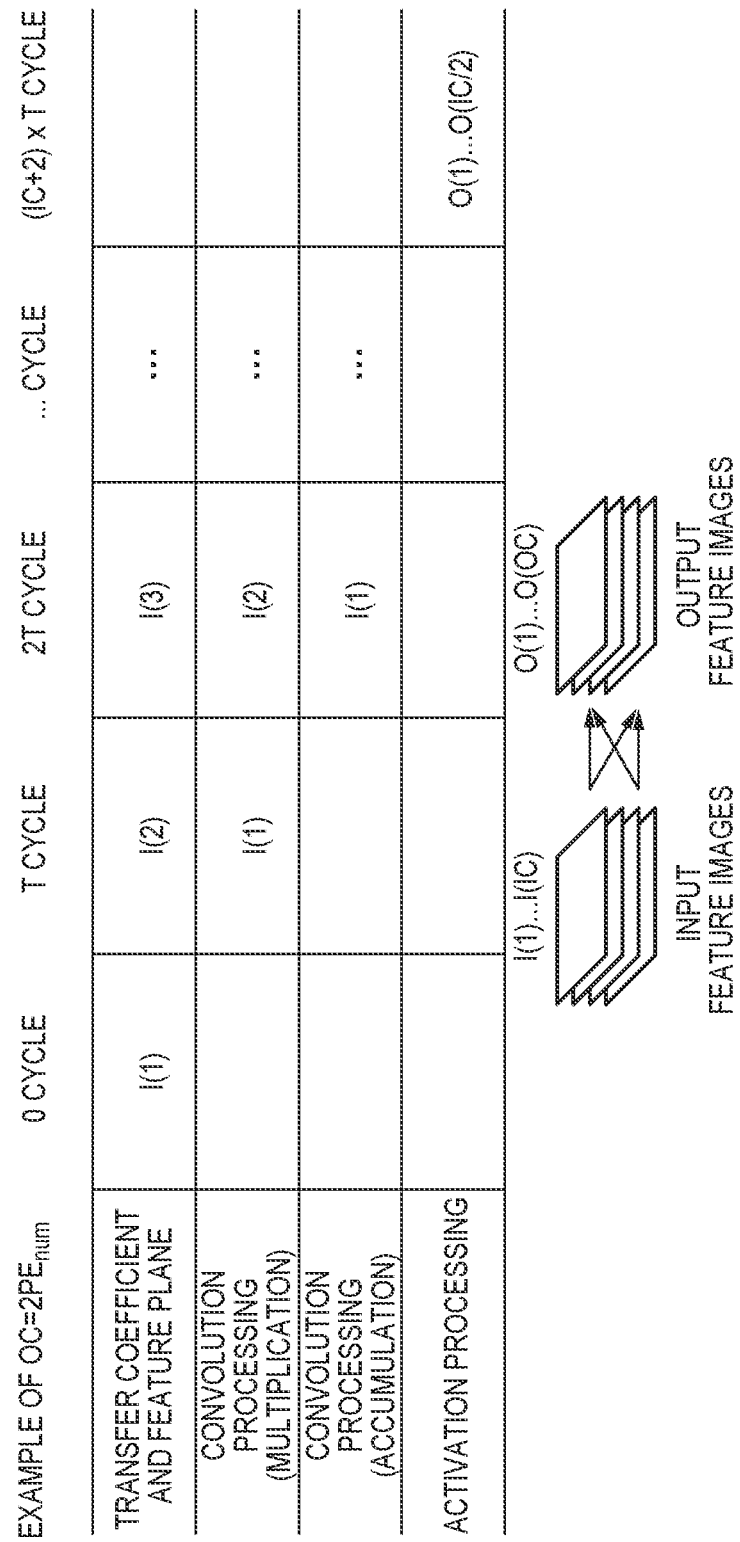
FIGS. 12A and 12B are diagrams illustrating pipeline processing of a convolutional neural network.

FIG. 12A illustrates an example of a case where depthwise convolution processing is not to be performed. In this example, there are IC input feature images, and OC output feature images. In the time from 0 cycle to T cycle, the first input feature image and the filter weighting coefficients used in the convolution processing are transferred. In the time from T cycle to 2T cycle, the second input feature image and the filter weighting coefficients used in the convolution processing are transferred, and the first input feature image is multiplied by the filter weighting coefficients. In the time from 2T cycle to 3T cycle, the third input feature image and the filter weighting coefficient used in the convolution processing are transferred, the second input feature image is multiplied by the filter weighting coefficients, and the results of the multiplication for the first input feature image are accumulated. Similar processing is repeated in the time from 3T cycle to $(IC+2)\times T$ cycle, and $PE_{num}$ convolution processing results are obtained. In the time from $(IC+2)\times T$ cycle to $(IC+3)\times T$ cycle, activation processing is performed using the $PE_{num}$ results obtained by the convolution processing performed on the IC input feature images. As a result, an output feature image for $PE_{num}$ output feature images (the first to (OC/2)th images) is generated. (OC/2)+

1th to OCth output feature images can furthermore be obtained by performing the same processing once more.

Figure 12B:
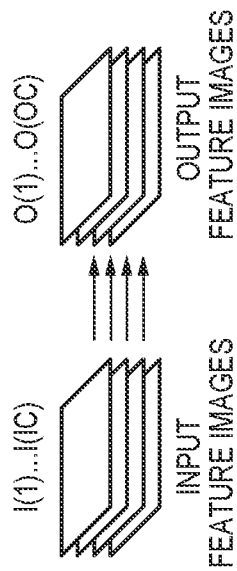

FIG. 12B illustrates an example of a case where depthwise convolution processing is to be performed. In this example, there are IC input feature images, and OC output feature images, and IC=OC=2PE$_{num}$. In the time from 0 cycle to T cycle, the first to PE$_{num}$th input feature images and the filter weighting coefficients used in the convolution processing are transferred. In the time from T cycle to 2T cycle, the PE$_{num}$+1th to ICth input feature images and the filter weighting coefficients used in the convolution processing are transferred, and the first to PE$_{num}$th input feature images are multiplied by the filter weighting coefficients. In the time from 2T cycle to 3T cycle, the PE$_{num}$+1th to ICth input feature images are multiplied by the filter weighting coefficients, and the results of the multiplication for the first to PE$_{num}$ th input feature images are accumulated. In the time from 3T cycle to 4T cycle, the results of the multiplication for the PE$_{num}$+1th to ICth input feature images are accumulated. Activation processing is performed using each of the PE$_{num}$ results obtained by the convolution processing performed on the first to PE$_{num}$ th input feature images, and an output feature image for PE$_{num}$ output feature images (the first to IC/2)th images) is generated. In the time from 4T cycle to 5T cycle, activation processing is performed using each of the PE$_{num}$ results obtained by the convolution processing performed on the PE$_{num}$+1th to ICth input feature images. In this manner, an output feature image for PE$_{num}$ output feature images (the IC/2+1th to ICth images) is generated.

Accordingly, the processing time taken when performing depthwise convolution processing can be shortened compared to when not performing depthwise convolution processing, as in the example illustrated in FIGS. 5A to 5E.

Fourth Embodiment

In the foregoing embodiments, the convolution processing is performed in units of feature images. For example, in step S107 of the first embodiment, the feature image is transferred to the feature data holding unit 403. However, it is not necessary to transfer the data and perform the convolution processing in units of feature images. For example, a feature image may be transferred over several times through block-based transfer, and the convolution processing may be performed in units of blocks.

When performing block-based processing, a data transfer time corresponding to an access time in which the holding unit 402 is accessed in step S107 is expressed as T$_m$, and the time of the convolution processing in step S108 is expressed as T$_c$. When depthwise convolution processing is not to be performed, T$_m$ and T$_c$ can be expressed through the following Expressions (4) and (5).

$$T_m = \max\left(IC \times \left\lceil \frac{IN \times IM}{BW_{FM}} \right\rceil \times \left\lceil \frac{OC}{PE_{num}} \right\rceil, IC \times OC \times \left\lceil \frac{X \times Y}{BW_W} \right\rceil \right) \quad (4)$$

$$T_c = X \times Y \times IC \times \left\lceil \frac{ON \times OM}{MAC_{PE}} \right\rceil \times \left\lceil \frac{OC}{PE_{num}} \right\rceil \quad (5)$$

On the other hand, when depthwise convolution processing is to be performed, IC and OC take on the same value, and T$_m$ and T$_c$ can be expressed through the following Expressions (6) and (7).

$$T_m = \max\left(OC \times \left\lceil \frac{IN \times IM}{BW_{FM}} \right\rceil, OC \times \left\lceil \frac{X \times Y}{BW_W} \right\rceil \right) \quad (6)$$

$$T_c = X \times Y \times \left\lceil \frac{ON \times OM}{MAC_{PE}} \right\rceil \times \left\lceil \frac{OC}{PE_{num}} \right\rceil \quad (7)$$

The meanings of the parameters in expressions (4) to (7) will be described below. The size of the filter weighting coefficients of the filters used in the convolution processing and the size of the pixel data of the feature images may vary depending on the layer information and the like indicated in the network structure information. Accordingly, the block size, the filter size, and the like are expressed using bits rather than numbers.

IC: number of input feature images
OC: number of output feature images
IN×IM: input block size (bits)
ON×OM: output block size (bits)
X×Y: filter size (bits)
BW$_{FM}$: transfer bandwidth for feature images (bits/time)
BW$_W$: transfer bandwidth for filter weighting coefficients (bits/time)
MAC$_{PE}$: parallelism of product-sum operation processing of processor in convolution processing
PE$_{num}$: number of processors in convolution processing T$_c$ is proportional to the filter size. When performing pipeline processing, the processing time for one cycle is the maximum value of T$_m$ and T$_c$.

FIG. 13 is a diagram illustrating pseudocode for block-based processing. Although the loop configuration is similar to the flowchart in FIGS. 1A and 1B, a loop for block processing has been added. Note that when the number of output feature images is higher than the processing parallelism, first, PE$_{num}$ output feature images (first to PE$_{num}$ th images) can be generated through block-based processing. Then, the generation of PE$_{num}$ output feature images (from the PE$_{num}$+1th image on) can be repeated by performing further block-based processing. As another method, the feature data for the second and subsequent blocks of all output feature images may be generated after the feature data for the first block of all the output feature images has been generated.

Figure 14:
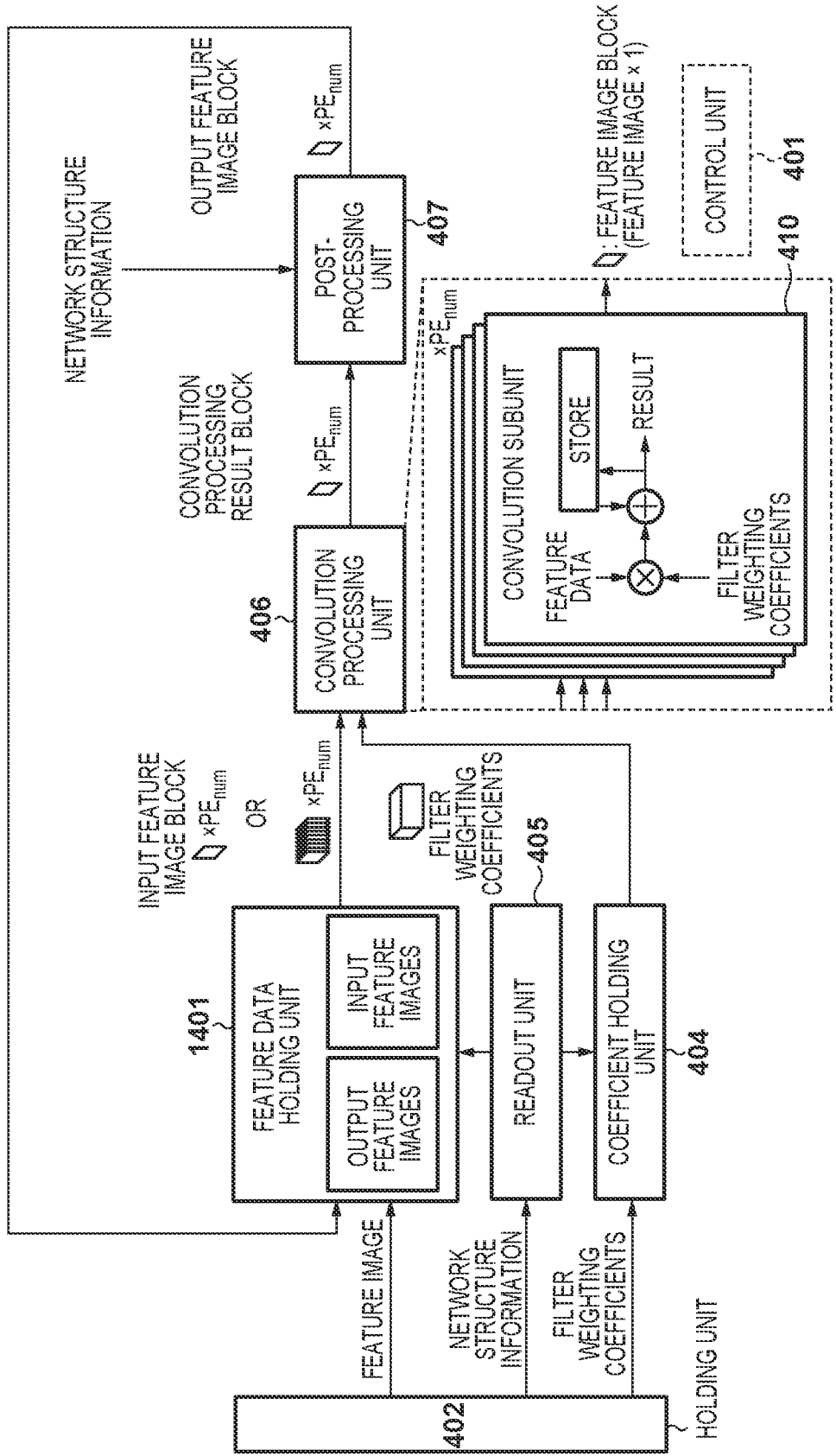
FIG. 14 is a block diagram illustrating an example of the configuration of a processing apparatus according to one embodiment.

FIG. 14 illustrates an example of the configuration of the CNN processing unit 305 which can be used to perform block-based processing. A feature data holding unit 1401 can hold input feature images and output feature images. In such a configuration, the control unit 401 holds the result of processing by the post-processing unit 407 in the feature data holding unit 403, and handles that result as a feature image of the next layer. When performing the processing of the first layer, the control unit 401 reads out some of the input feature images from the holding unit 402, and transfers those feature images to the feature data holding unit 403. On the other hand, in the processing of the second and subsequent layer, the data held in the feature data holding unit 403 is used as an input feature image. Aside from the feature data holding unit 1401, the CNN processing unit 305 according to this configuration example is the same as the CNN processing unit 305 according to the first embodiment, but the feature data, the convolution processing results, and the like are transferred in block units.

In such a configuration, when it is determined that depthwise convolution processing is not to be performed, an output feature image of a single block is generated using the input feature images of a plurality of blocks. On the other hand, when depthwise convolution processing is to be performed, an output feature image of a single block is generated using an input feature image of a single block.

Such a configuration, in which block-based processing is performed, enables partial processing of feature data and is highly flexible, which makes it possible to process input images of various sizes. Depthwise convolution processing can be performed with a high level of efficiency in such a case as well.

Other Embodiments

The foregoing embodiments describe examples in which the type of convolution processing and the filter size differs from layer to layer. However, the filters or feature data used in a single layer may be classified into a plurality of groups, and the type of convolution processing and the filter size may differ from group to group. In such a case, too, the processing apparatus according to the foregoing embodiments may switch the processing from group to group. In other words, in the foregoing embodiments, the feature data and filter weighting coefficients used in the product-sum operations for the target layer may be classified into a plurality of groups. In this case, in the processing for the target layer, whether to perform the first processing or the second processing can be selected for each group to be processed.

The foregoing embodiments describe an example in which depthwise convolution processing is performed using a filter having a size of 3×3. However, the processing apparatus according to the foregoing embodiments can use the same hardware configuration to perform convolution processing using filters having different sizes. As such, the size of the filter used is not limited to 3×3, and may be 5×5 or 7×7 instead. The filter used may also be a filter that contains zero coefficients for dilated convolution processing. In other words, the convolution processing unit 406 can perform product-sum operations using filter weighting coefficients of a filter used in dilated convolution processing. The convolution subunit 410 has a configuration for performing product-sum operations on the supplied feature data and coefficient data one at a time, and is capable of convolution processing using a filter having any desired size. The foregoing embodiments can also handle a combination of convolution processing using a filter of any desired size and depthwise convolution processing.

FIG. 15 illustrates an example of a relationship between a network and convolution processing. In the processing of a layer 1501, in which depthwise convolution processing is performed, a mode on the left side of the box 420 is selected, and depthwise convolution processing is performed in parallel using a filter for dilated convolution processing. The filter used in the layer 1501 is an extension of a 3×3 filter, and has a size of 5×5. In a layer 1502, in which activation processing is performed, processing such as ReLU is performed. In the processing of a layer 1503, in which pointwise convolution processing is performed, depthwise convolution processing is not performed, and thus the mode on the right side of the box 420 is selected, and the convolution processing is performed using a 1×1 filter.

Although the first embodiment described an example in which only one input feature image is processed at the same time, a plurality of input feature images may be processed at the same time. For example, while one convolution subunit 410 is performing processing using feature image (3,1), another convolution subunit 410 may perform processing using feature image (3,2). Additionally, although the second embodiment described an example in which only one output feature image is generated through parallel processing, a plurality of output feature images may be generated at the same time. For example, while one convolution subunit 410 is generating feature image (4,1), another convolution subunit 410 may generate feature image (4,2).

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-118737, filed Jul. 9, 2020, which is hereby incorporated by reference herein in its entirety.

What is claimed is:

1. A processing apparatus for performing operations with a convolutional neural network having a plurality of layers, the apparatus comprising:
   a controller configured to sequentially select each of the plurality of layers as a target layer;
   a data holder configured to hold at least some of data of a plurality of channels in the target layer;
   a plurality of processors, each configured to perform, in parallel, a multiply-accumulate operation using the data of one channel of the target layer and a coefficient corresponding to the target layer; and
   a selector configured to select whether to perform first processing or second processing on the basis of information specifying processing in the target layer,
   the first processing including while inputting the data of different channels of the target layer, held by the data holder, into respective processors of the plurality of processors in parallel, inputting the data of pixels of one channel of the target layer into a corresponding processor of the plurality of processors to calculate a value corresponding to data of a pixel of one channel of the next layer after the target layer by one processor of the plurality of processors, and the second processing including sequentially reading out the data of each channel of the plurality of channels of the target layer, held by the data holder, and also sequentially inputting the data of each channel of the plurality of channels of the target layer to the plurality of processors in parallel so as to inputting the same data of one channel of the target layer to the plurality of processors in parallel to calculate a value corresponding to data of a pixel of one channel of the next layer by one processor of the plurality of processors.

2. The processing apparatus according to claim 1, wherein in the second processing, the data of each one channel among the plurality of channels in the target layer is input to the plurality of processors from the data holder in parallel.

3. The processing apparatus according to claim 2, wherein in the second processing, each of the plurality of processors is further configured to output a computation result corresponding to one channel in a next layer after the target layer, using the data of a corresponding channel in the target layer which has been input in sequence.

4. The processing apparatus according to claim 1, further comprising:
a plurality of data storages,
wherein in the first processing, each of the plurality of data storages is configured to supply the data of a corresponding one channel in the target layer to a corresponding one of the plurality of processors, wherein each of the plurality of data storage corresponds to a different one of the plurality of processors, and
in the second processing, one data storage among the plurality of data storages is configured to supply the data of the same one channel in the target layer to each of the plurality of processors.

5. The processing apparatus according to claim 1, wherein in the first processing, data of a plurality of channels in the target layer, stored in the data holder, is input in parallel to the plurality of processors so that data of one channel is input to a corresponding one of the processors.

6. The processing apparatus according to claim 1, wherein in the first processing, each of the plurality of processors is further configured to output a computation result corresponding to one channel in a next layer after the target layer, using the data of one channel in the target layer.

7. The processing apparatus according to claim 1, further comprising:
a coefficient holder configured to hold at least some of the coefficients used in the multiply-accumulate operations in the target layer; and
a supply controller configured to control a supply of data from the data holder and the coefficient holder to the plurality of processors,
wherein each of the plurality of processors is further configured to perform the multiply-accumulate operation by calculating a product of one piece of the data and one of the coefficients which have been input and then totaling the calculated products.

8. The processing apparatus according to claim 1, wherein the data and the coefficients used in the multiply-accumulate operations in the target layer are classified into a plurality of groups, and
the selector is further configured to select whether to perform the first processing or the second processing on the basis of the group of the data and the coefficients used in the multiply-accumulate operations.

9. The processing apparatus according to claim 1, wherein the coefficients are filter weighting coefficients of a filter for convolution processing, and a size of the filter is configurable for each of the layers.

10. The processing apparatus according to claim 1, wherein the coefficients are filter weighting coefficients of a filter for dilated convolution processing.

11. The processing apparatus according to claim 1, wherein the data holder is memory,
each of the processors includes a computing core having a multiplier and an adder, and
the processing apparatus includes a chip on which the memory and the computing cores are provided.

12. The processing apparatus according to claim 11, wherein the selector includes an address designator configured to designate an address, in the memory, of the data input to the computing cores, the address designator being provided on the chip.

13. The processing apparatus according to claim 11, wherein the selector includes a multiplexer configured to select an input to the computing cores from a plurality of sources or to select one output among outputs from the plurality of computing cores, the multiplexer being provided on the chip.

14. The processing apparatus according to claim 1, wherein operations with the convolutional neural network are performed for a processing target image, and
the data in the target layer is a feature image obtained in a process of performing the operations with the convolutional neural network.

15. The processing apparatus according to claim 14, further comprising:
a controller configured to control the plurality of processors to perform the operations with the convolutional neural network on the processing target image; and
an image processor configured to perform image processing on the processing target image on the basis of a processing result obtained by performing the operations with the convolutional neural network on the processing target image.

16. A processing apparatus for performing operations with a convolutional neural network having a plurality of layers, the apparatus comprising:
a controller configured to sequentially select each of the plurality of layers as a target layer;
a data holder configured to hold at least some of data of a plurality of channels in the target layer;
a plurality of processors, each configured to perform, in parallel, a multiply-accumulate operation using the data of one channel of the target layer and a coefficient corresponding to the target layer;
an accumulator configured to accumulate processing results of each of the plurality of processors; and
a selector configured to select whether to perform first processing or second processing on the basis of information specifying processing in the target layer,
the first processing including while inputting the data of different channels of the target layer into respective processors of the plurality of processors in parallel, inputting the data of pixels of one channel of the target layer into a corresponding processor of the plurality of processors to calculate a value corresponding to data of a pixel of one channel of the next layer after the target layer by one processor of the plurality of processors, and outputting a processing result of each of the plurality of processors as a value corresponding to input data of corresponding channel in the next layer after the target layer, and the second processing including while inputting the data of different channels of the target layer into respective processors of the plurality of processors in parallel, inputting the data of pixels of one channel of the target layer into a corresponding processor of the plurality of processors, accumulating the processing results of each of the plurality of processors by the accumulator to calculate a value corresponding to data of a pixel of one channel of the next layer, and outputting the accumulated processing results obtained by the accumulator as a value corresponding to input data of a single channel in the next layer.

17. The processing apparatus according to claim 16, wherein in the second processing, data of a plurality of channels in the target layer, stored in the data holder, is input in parallel to the plurality of processors so that data of one channel is input to a corresponding one of the processors.

18. The processing apparatus according to claim 16, further comprising:
a plurality of result storages, each corresponding to one of the plurality of processors,
wherein in the first processing, each of the plurality of processors is further configured to output the processing result to a corresponding one of the result storages, and
in the second processing, each of the plurality of processors is further configured to output the processing result to the accumulator, and the accumulator is further configured to output a result of the accumulating to one of the plurality of result storages.

19. A processing apparatus for performing operations with a convolutional neural network having a plurality of layers, the apparatus comprising:
a controller configured to sequentially select each of the plurality of layers as a target layer;
a data holder configured to hold at least some of data of a plurality of channels in the target layer;
a plurality of processors, each comprising a processing core and a storage, wherein the processing cores of the plurality of processors are configured to perform, in parallel, a multiplication operation using the data of one channel of the target layer and a coefficient corresponding to the target layer, and each of the storages of the plurality of processors is configured to accumulate a result of the multiplication operation; and
a selector configured to select whether to perform first processing or second processing on the basis of information specifying processing in the target layer,
the first processing including:
inputting the data of different channels of the target layer, held by the data holder, into respective processors of the plurality of processors in parallel;
inputting the data of pixels of one channel of the target layer into a processing core of a corresponding processor of the plurality of processors;
performing the multiplication operation using the data of pixels of one channel of the target layer and the coefficient corresponding to the target layer by the processing core of the corresponding processor; and
accumulating the result of the multiplication operation in the storage of the corresponding processor, wherein the accumulated results in the storages of the plurality of processor correspond to data of a pixel of respective channels of the next layer after the target layer, and the second processing including:
sequentially reading out the data of each channel of the plurality of channels of the target layer, held by the data holder;
sequentially inputting the data of each channel of the plurality of channels of the target layer to the plurality of processors in parallel so as to inputting the same data of one channel of the target layer to the plurality of processors in parallel; and
performing the multiplication operation using the data of pixels of each channel of the target layer and the coefficient corresponding to the target layer by the processing core of each processor of the plurality of processors and accumulating the result of the multiplication operation in the storage of the same processor, wherein the accumulated results in the storages of the plurality of processor correspond to data of a pixel of respective channels of the next layer.

20. A processing apparatus for performing operations with a convolutional neural network having a plurality of layers, the apparatus comprising:
a controller configured to sequentially select each of the plurality of layers as a target layer;
a data holder configured to hold at least some of data of a plurality of channels in the target layer;
a plurality of processors, each comprising a processing core and a storage, wherein the processing cores of the plurality of processors are configured to perform, in parallel, a multiplication operation using the data of one channel of the target layer and a coefficient corresponding to the target layer, and each of the storages of the plurality of processors is configured to accumulate a result of the multiplication operation;
the first processing including:
inputting the data of different channels of the target layer into respective processors of the plurality of processors in parallel;
inputting the data of pixels of one channel of the target layer into a processing core of a corresponding processor of the plurality of processors;
performing the multiplication operation using the data of pixels of one channel of the target layer and the coefficient corresponding to the target layer by the processing core of the corresponding processor;
accumulating the result of the multiplication operation in the storage of the corresponding processor; and
outputting the accumulated result in the storage of each of the plurality of processors as a value corresponding to input data of a pixel of a corresponding channel in the next layer after the target layer, and
the second processing including:
inputting the data of different channels of the target layer into respective processors of the plurality of processors in parallel;
inputting the data of pixels of one channel of the target layer into a processing core of a corresponding processor of the plurality of processors;
performing the multiplication operation using the data of pixels of one channel of the target layer and the coefficient corresponding to the target layer by the processing core of the corresponding processor;

accumulating the result of the multiplication operations by the processing cores of the plurality of processors; and outputting the accumulated result as a value corresponding to input data of a single channel in the next layer.

\* \* \* \* \*